(12) United States Patent
Paduroiu

(10) Patent No.: US 11,347,747 B1
(45) Date of Patent: May 31, 2022

(54) ORDERING DATA STREAM EVENTS IN A STREAMING DATA STORAGE PLATFORM

(71) Applicant: EMC IP Holding Company LLC, Hopkinton, MA (US)

(72) Inventor: Andrei Paduroiu, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/148,955

(22) Filed: Jan. 14, 2021

(51) Int. Cl.
*G06F 16/22* (2019.01)
*G06F 16/2455* (2019.01)

(52) U.S. Cl.
CPC .... *G06F 16/24568* (2019.01); *G06F 16/2246* (2019.01); *G06F 16/24552* (2019.01)

(58) Field of Classification Search
CPC ........... G06F 16/24568; G06F 16/2246; G06F 16/24552
See application file for complete search history.

(56) References Cited

U.S. PATENT DOCUMENTS

| 10,223,090 | B2 * | 3/2019 | Jung | G06F 9/382 |
|---|---|---|---|---|
| 10,565,208 | B2 | 2/2020 | Triou et al. | |
| 11,100,111 | B1 * | 8/2021 | Akidau | G06F 16/258 |
| 11,113,287 | B1 * | 9/2021 | Landry | G06F 16/3331 |
| 2016/0219089 | A1 * | 7/2016 | Murthy | H04L 65/4076 |
| 2017/0083378 | A1 * | 3/2017 | Bishop | G06F 9/5072 |
| 2018/0332365 | A1 | 11/2018 | Kaitchuck et al. | |
| 2020/0259918 | A1 * | 8/2020 | Luft | H04L 67/2852 |
| 2020/0402058 | A1 * | 12/2020 | Zhou | G06Q 20/3276 |
| 2021/0185142 | A1 * | 6/2021 | Paduroiu | G06F 12/0868 |
| 2021/0263937 | A1 * | 8/2021 | Danilov | G06F 7/14 |
| 2021/0342296 | A1 * | 11/2021 | Danilov | G06F 16/182 |
| 2021/0342354 | A1 | 11/2021 | Danilov et al. | |

OTHER PUBLICATIONS

Notice of Allowance received for U.S. Appl. No. 17/109,523 dated Apr. 28, 2022, 46 pages.

* cited by examiner

*Primary Examiner* — Jorge A Casanova
(74) *Attorney, Agent, or Firm* — Amin, Turocy & Watson, LLP

(57) ABSTRACT

A streaming data storage system maintains streamed events based on external ordering (position) data. Each segment of the stream has minimum position maximum position metadata values based on the events' positions therein. When an ordered event is appended to an ordered segment, an index segment maintains offset information that tracks the event's position order relative to offsets of other previously appended events. When a segment is scaled (split or merged), the predecessor segment set's maximum position is the basis for the successor segment set's minimum position. An event is written to any predecessor segment or successor segment based on the event's routing key and position with respect to a matching segment's routing key and minimum and maximum positions. A data stream can be truncated based on a specified position. Reads can be for events between a specified range of positions, including a range that spans predecessor and successor segments.

20 Claims, 15 Drawing Sheets

US 11,347,747 B1

ORDERING DATA STREAM EVENTS IN A STREAMING DATA STORAGE PLATFORM

TECHNICAL FIELD

The subject application relates generally to data storage, and, for example, to a technology that orders events in storage systems that implement data streams for storing and serving continuous and unbounded data, and related embodiments.

BACKGROUND

Some contemporary data storage systems, such as DELL EMC's PRAVEGA system/data storage service, store data in a storage abstraction referred to as a data stream, or more simply, a stream. A stream is identified with a name, and can store continuous and potentially unbounded data; more particularly, a stream comprises a durable, elastic, append-only, sequence of stored events. New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

One stream may be divided into one or more segments, with each new event appended by a writer application to a segment that is determined based on a hash computation of a routing key associated with that event. Once written, the events in a stream/stream segment are immutable and cannot be modified. At the same time, PRAVEGA guarantees ordering within a stream, in which the order that stream data is consumed by readers is generally the same as the order in which the events were ingested into the system and thus written to a stream segment. In some scenarios, however, this may not be the order in which a user of the system wants the data to be consumed by a reader application.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
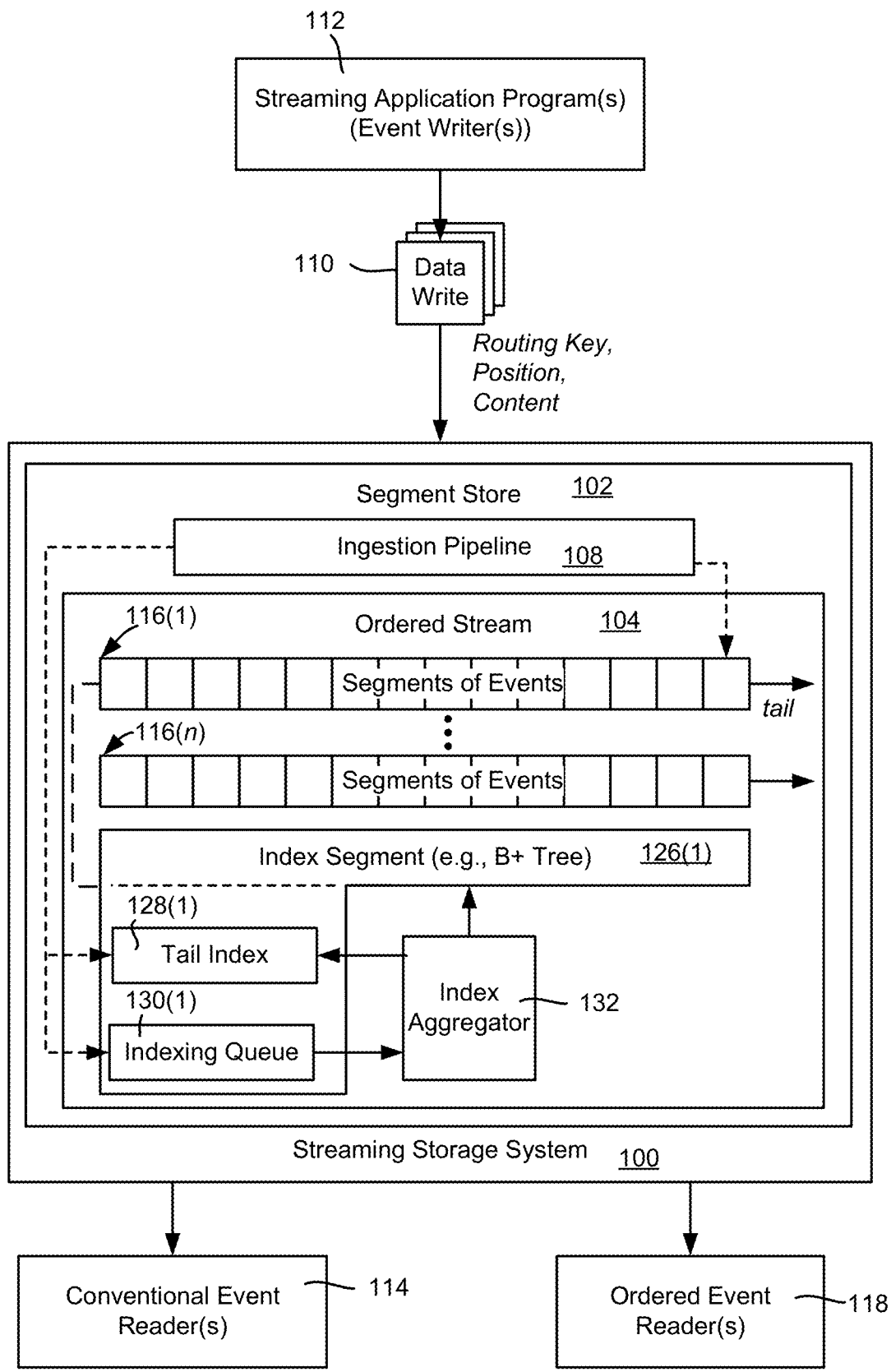
FIG. 1 is a block diagram representation of example components and data—related operations in a streaming data storage system in which events can be viewed in order via an ordered data stream of ordered segments, in accordance with various aspects and implementations of the subject disclosure.

Various aspects of the technology described herein are generally directed towards an ordered stream that facilitates an ordered view of streaming data events within one or more data stream segments. The order in which the events are consumed by an ordered stream-capable reader application depends on user-specified position data associated with the events. In general, the events that an ordered stream-capable writer application writes comprise an additional component, namely a position value, (or more simply a "position"). Thus, in addition to the existing routing key and event contents (the payload), an ordered event includes a position. More particularly, the position is a value (e.g., number) that the application provides with each event, and which is used to define the order of that event relative to other events within the enclosing ordered stream. In this way, regardless of the actual order in which events are appended to a segment, when reading events supplied with positions, the data storage system is able to serve events in a natural order of positions (within a given routing key), including events spanning multiple segments.

A data stream comprised of segments has metadata pertaining to the segments that make up the ordered stream. Further, the segments of an ordered stream comprise per-segment metadata. In one aspect, the technology described herein facilitates working with groups of events that span multiple segments, by tracking, for each segment, the minimum position value among the events within that segment, and the maximum position value among the events within the segment.

It should be understood that any of the examples herein are non-limiting. For instance, some of the examples are based on PRAVEGA data storage technology; however virtually any stream-based data storage system may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a segment store 102 that maintains segments of streamed data events of a data stream 104, including data streams comprised of ordered segments 106. In general, an ingestion pipeline 108 appends data writes 110 received from one or more streaming application programs 112, referred to as event writer(s). As described herein, one type of event writer provides events that include position data for the ordered segment 106. As is known, a conventional event comprises a routing key along with the event data contents to be stored; the contents are alternatively referred to herein as the payload. The ingestion order into the pipeline 108 generally determines the order of appending the conventional data write events 110; a conventional event reader (application program) 118 consumes the events in the ingestion order for processing.

As described herein, for an ordered event, each of the data writes 110 contains the routing key, a relative position value and contents (the payload). As set forth herein, the position is a value (e.g., a number, which can be a timestamp or the like) that the writer application 112 provides with each event. The position can be anything (e.g., that fits into a field or the like) that a user (e.g., administrator) specifies for the application, based whatever criteria the user desires. While the ingestion order determines the order of appending the data write events, via the position data the writer application defines the order of an event (relative to other ordered events) within the enclosing segment, which in this example is one of the ordered segments 122(1)-122(n). When ordered events are read by an ordered event-capable event reader (or readers) 118, the events are read in position order.

By way of an example, consider the following events (denoted as Event:Position for simplification) ingested (appended) in the following order E1:10, E2:15, E3:5, E4:11. The ordered event reader 118 reads the events in their position order of E3, E1, E4, E2 (based on their positions of 5, 10, 11, 15).

Continuing with example above, if the system further appends E5:11 and E6:20, then a full re-read of the yields E3, E1, E4, E2, E5, E6 (based on their relative positions of (5, 10, 11, 11, 15, 20); as described herein such events can span multiple segments of the data stream. Note that in this example, because both E2 and E5 had position values of 11, the order of appending provided the tiebreaking mechanism, although it is feasible to have E5 read before E2 with a different tiebreaking mechanism (or with none). Further note that if an ordered reader application program has already read E3, E1, E4, E2, a continuation of the previous read yields E5, E6 (after E3, E1, E4, E2). This is a departure from the read consistency guarantee for classic streams, which says that once events were read in an order, they will always be read in that order. As such, ordered streams are based on a new primitive as described herein.

In one or more implementations, each ordered segment such as the ordered segment 116(1) of FIG. 1 comprises sub-segments, including the event segment (ES) 116(1) and an index segment (IS) 126(1). Both the event segment 116(1) and index segment 126(1) can be regular PRAVEGA segments (although alternative implementations can have different data structures). The event segment 116(1) holds the events appended to the ordered segment 104, while the index segment 126(1) contains position-related data that can be used to rearrange those events from the append-based ordering to the position-based ordering.

More particularly, consider that the event segment 116(1) is a classic (e.g., PRAVEGA) data storage segment, that is, the ordered view is able to be provided on top of a classic data storage segment that stores data via append-based ordering. Such an event segment 116(1) is immutable once written, and there is no manipulation of events within the event segment. As described herein, via the index segment 126(1), the technology provides an ordered view into the event segment.

It should be noted that in one or more implementations, the index segment 126(1) can receive frequent updates, and as such, for practical reasons other data structures and components are provided to facilitate batch updates to the index segment 126(1) while still providing full order-based reads of the event segment 116(1). As shown in FIG. 1 and as described herein, in one or more implementations, the additional data structures include a tail index 128(1) (which also includes or is coupled to logic as described herein) and an indexing queue 130(1); an index aggregator component 132 performs the batch updates to the index segment 126(1), and accesses/maintains the data structures.

Figure 2:
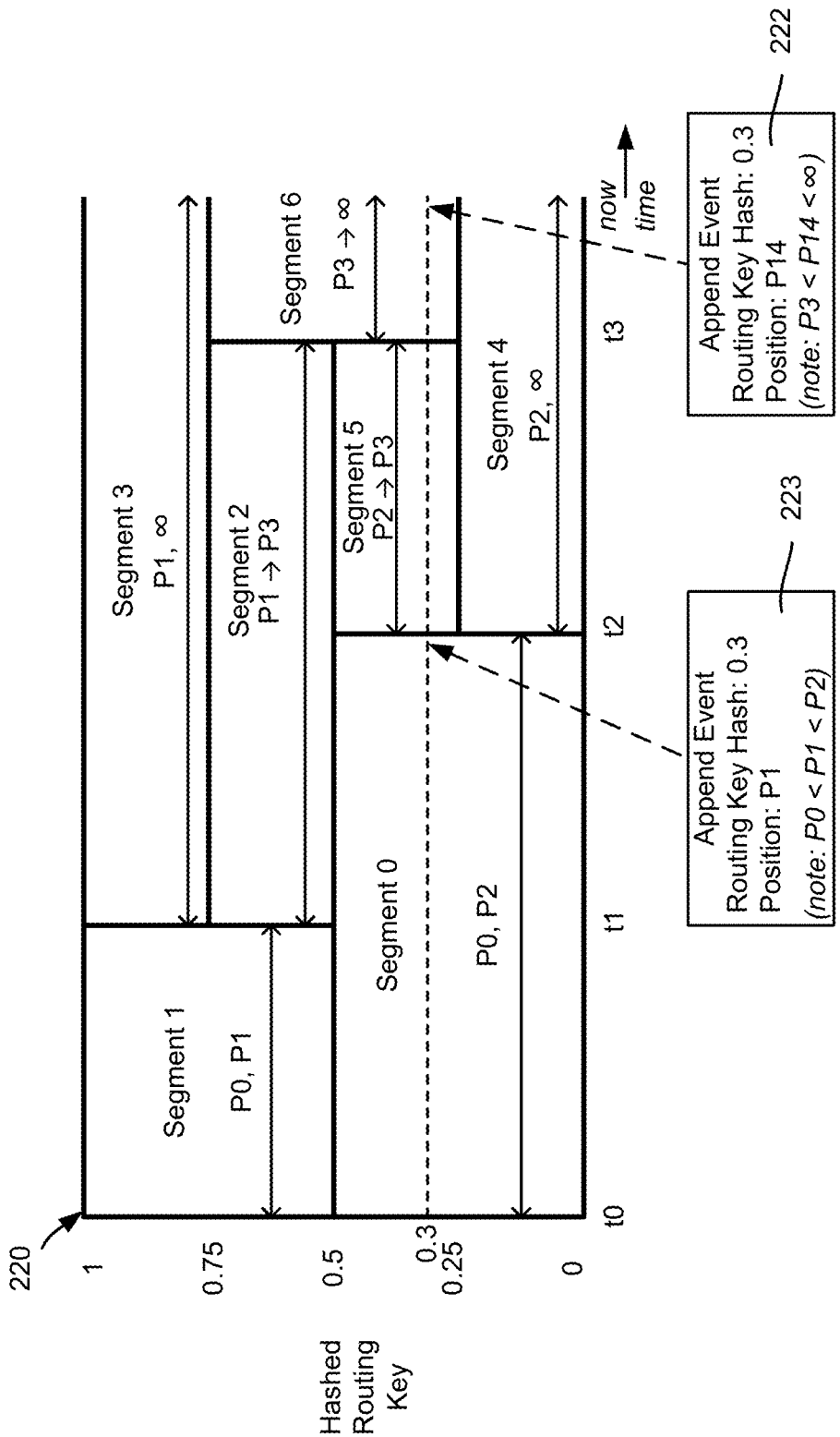
FIG. 2 is a representation of an example data stream's segments changing over time due to scaling events (splits or merges), and how routing key and position data determines to which segment a new event is appended, in accordance with various aspects and implementations of the subject disclosure.

FIG. 2 shows additional details of segments of an ordered stream 220 as described herein, in which new events are appended to the end (tail) of a stream. As described herein, each ordered event has a routing key, a position value, and an event payload. The routing key can be named by the user, and is often derived from data naturally occurring in the event, e.g. "device-id" of the device that generated the event; should the user not specify a routing key, a routing key can be randomly assigned by the streaming data storage system. Events are ordered per routing key, and can be read in append order by a conventional reader, or position order by a position-aware event reader.

As shown in FIG. 2, the data stream 220 is split into segments, which are logical containers for the events within the data stream 220. When a new event is written to a stream, the event is stored to one of the segments based on the event's routing key. As can be seen in FIG. 2, event routing keys are hashed (using consistent hashing) to form a "key space" which corresponds to the number of segments.

FIG. 2 also shows that data streams such as the data stream 220 are elastic as the streaming data storage system can change a data stream's number of segments over time. The streaming data storage system monitors the usage of each of the stream's segments and decides whether those segments need to be split or merged, e.g., based on the current event ingestion rate. A segment split creates two or more successor segments that evenly split that segment's routing key space. A segment merge combines two or more segments that are assigned to adjacent routing key spaces and creates a lesser number (typically one) successor segment that is assigned to the combined routing key space of the original predecessor segments. This elasticity allows data streams to react to changes in ingestion patterns (more segments are created when ingestion throughput increases and fewer segments are used when ingestion drops down).

By way of example, the data stream 220 starts with two parallel segments, Segment 1 and Segment 0. At time t1, Segment 1 is split, with Segments 2 and 3 as successors. At time t2, Segment 0 is split, with Segments 4 and 5 as successors, and at time t3, Segments 2 and 5 are merged with Segment 6 as a successor.

As described herein, in one implementation a controller (a component of the streaming data storage system) coordinates any stream scaling events. The controller maintains metadata of the data stream, including the segments (via segment identifiers, or segment IDs) that make up the data stream, along with their predecessor-successor relationships and routing key space assignments.

As described herein, to provide an ordered data stream, the user-provided ordering needs to be maintained across the entire data stream, which as shown in FIG. 2 can contain multiple, dynamically-scaled segments at different times. In previous technologies, a segment split or merge atomically sealed (no further appends accepted) the segment or segments of the predecessor segment set; a writer that attempted to write to a sealed segment had the write failed by the system, and thus queried the controller to find the new segment or segments of the successor segment set and continue with event writes to the new segment or one of the new segments.

As shown in FIG. 2, the previous technology of sealing predecessor segment(s) does not work with ordered data streams, because an event with an earlier position may map to an earlier segment. Thus, the technology described herein leaves segments unsealed ("open") for appends after scaling (so that out-of-order events that arrive around scaling boundaries can still be written).

In the example of FIG. 2, after a number of scaling operations, at the current ("now") time, there are three active, successor segments (Segments 3, 4 and 6) and four predecessor segments (Segments 0, 1, 2 and 5). Each of these segments holds events between certain positions. Thus, to append an event 222 with a routing key that hashes to 0.3 and a position value of P14, the system appends the event 222 to Segment 6 (because that is the active segment overlapping routing key 0.3).

However, consider an event 223 with the same routing key (corresponding to 0.3) that arrives later with a position value of P1. In previous systems with sealed segments and active segments, the event would be appended to the end of Segment 6, because that is the active segment for a routing key that hashes to 0.3; however doing so would cause such an event to be written out of order, as position P1 belongs to Segment 0 (for that routing key). If the event is appended to Segment 6, a downstream reader would not know of the event's existence (unless buffering all events from Segments 0, 5 and 6 until the event is found, which is not practical in most scenarios).

Instead, to provide strict ordering guarantees, the technology described herein keeps predecessor segments (including Segment 0) unsealed, and thus appends the event 223 with the routing key that hashes to 0.3 and the position value of P1 to Segment 0, which spans positions P0 to P2 (P0<P1<P2).

Figure 3:
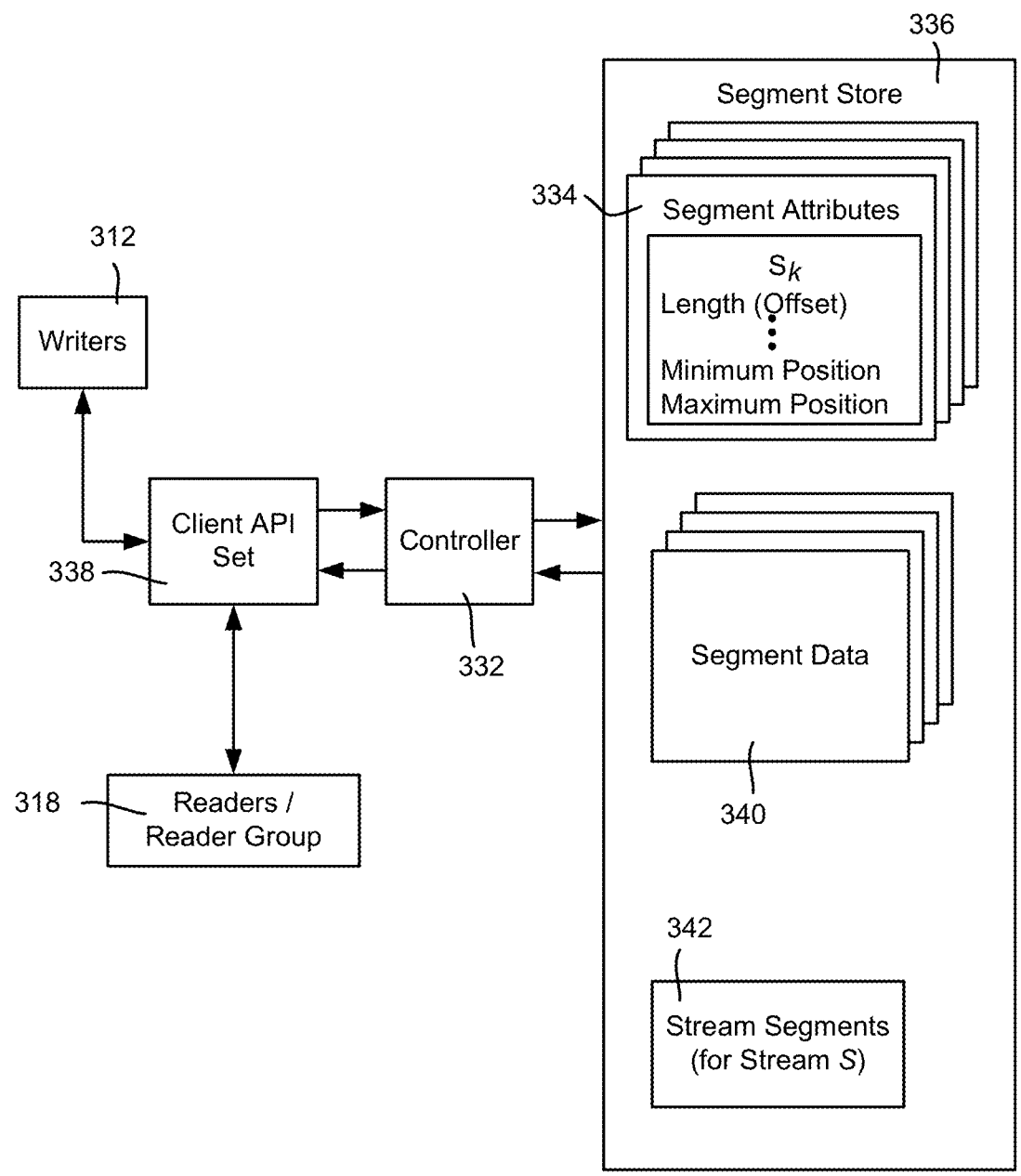
FIG. 3 is a block diagram representation of example components and related data structures in a streaming data storage system in which events can be viewed in order via an ordered data stream of ordered segments, in accordance with various aspects and implementations of the subject disclosure.

To implement an ordered stream, the streaming data storage system (e.g., the controller) tracks, for each segment, the starting (minimum, or MinPos) position value among the events within that segment, and the ending (maximum, or MaxPos) position value among the events within the segment. This is shown in the example components of FIG. 3, where the controller 332 maintains the minimum and maximum position values in the segment attributes 334 maintained for each segment, e.g., in a segment store 336. For additional detail, FIG. 3 also shows writers 312 and readers/reader groups 318 interfacing with the system (controller 332) via a client component (containing a set of APIs) 338, including to read/write segment data 340 to the data stream segments 342. Note that FIG. 3 only shows some non-limiting examples of some of the metadata of a data stream, and as is understood, various alternative data structures can be used to maintain the metadata (e.g., trees that facilitate more efficient access to the metadata).

Figure 4:
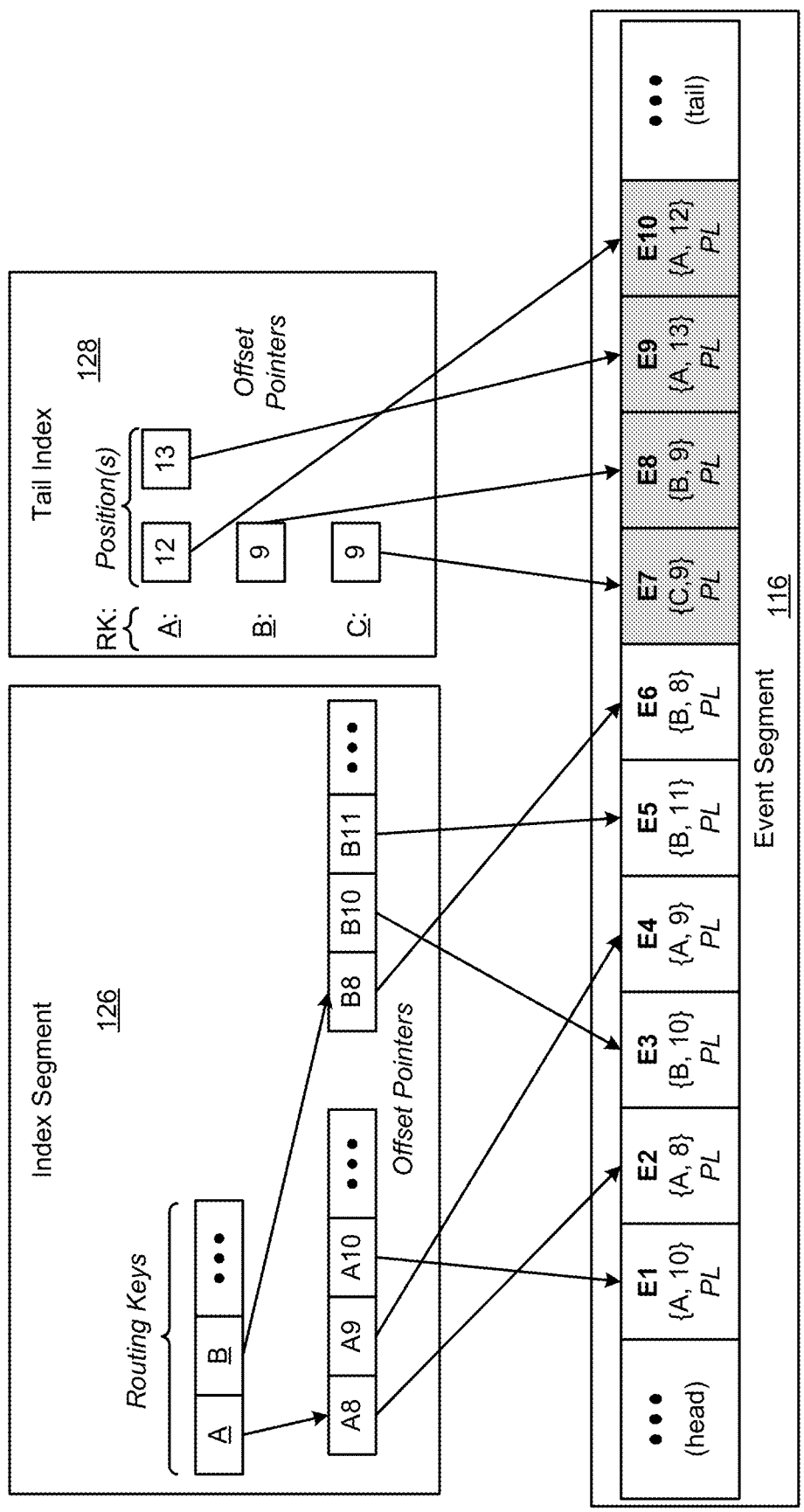
FIG. 4 is an example representation of an event segment in conjunction with an index segment and tail index that facilitate maintaining the relative ordering of the events in the event segment, in accordance with various aspects and implementations of the subject disclosure.

Turning to aspects related to how an ordered stream segment can maintain position information, FIG. 4 shows an index segment 126, comprising an index that sorts offsets (into an event segment 116) by routing key and position values. With respect to the index segment 126, index keys are the concatenation of routing keys and positions, while the keyed index values are the offsets within the event segment 116. Because the index keys are concatenated in this order (and the index is sorted), the index segment 126 is naturally sorted by routing key, and then by position within each routing key, (routing key, position grouping) as shown in the index segment 126 of FIG. 4.

Due to the concatenation of routing keys and positions, this allows effectively interleaving multiple indices efficiently into a single, bigger index (e.g., to better optimize for ordering within a routing key). This solution provides benefits over approaches having one such index per routing key, as there can be numerous (e.g., on the order of millions) of routing keys assigned to a single segment; interleaving indices as described herein helps reduce overhead relative to other approaches.

It should be noted that FIG. 4 depicts an index segment per event segment. As described herein, the routing key and position determine which segment (including a predecessor segment) to append an event to, and which index segment to update. It is feasible to maintain a single index segment for multiple segments, e.g., by having the offset pointer comprise a segment identifier along with the offset pointer to the event within the segment; (note that as described herein, the routing key and position are the basis for a segment identifier provided by a writer when requesting an event append).

As set forth herein, there are multiple ways to implement indices for an index segment, although one embodiment of an index segment described herein uses a B+tree implementation that is configured for append-only backing media. However, because the index segment 126 is subject to frequent updates, in this implementation the writing of updates to the index segment 126 can be delayed for efficiency, that is, updates are batched when there are sufficient updates to perform the index segment writing.

To efficiently access the indexing data until batch updated to the index segment 126, a tail index data structure 128 is maintained (e.g., in fast access memory/storage) to hold changes to the index segment 126 that have not yet been persisted to the index segment 126. The tail index 128 is modified whenever the system appends a new event, and the tail index 128 is trimmed every time one or more index changes are persisted to the index segment 126. The tail index 126 can be queried when a read operation is performed.

As shown in FIG. 4, the tail index 128 holds a sorted map, where each entry maps a routing key and position to an offset value within the event segment 116. From a logical point of view, the tail index 128 is a similar data structure to the structure of the index segment 126, while being configured (sorted) for reading by routing keys. Note that an indexing queue (130(1) (FIG. 1)) holds indexing similar information, in a format that is more optimal for updating the index segment 126.

Thus, in the example of FIG. 4, the index segment 126 contains position-based offset pointers to the event segment 116 (entries E1 to E6, containing, {routing key, position} and where PL represents payload/content), with the pointers sorted by their routing keys (A, then B and so on) and within each routing key by position (A8, A9, A10 . . . B8, B10, B11 . . . ) and so on by routing key, position groupings. The tail index 126 shows respective offset pointers to event entries E7-E10 (shown shaded) based on respective sorted routing keys A, B and C and their associated positions.

Returning to FIG. 1, as set forth herein, the index aggregator 132 monitors the indexing queue 130(1) and makes determinations as to when to persist changes (e.g., batch updates) to the index segment 126. The index aggregator 132 can operate asynchronously, in the background. Triggers for persisting the changes may be time based (elapsed time since last persist) or size-based (number and/or size of updates accumulated).

When persisting, the index aggregator 132 picks up one or more updates (an update set U) from the head of the indexing queue 130(1). The updates in U are mapped to contiguous ranges in the event segment 116. In one implementation, the index segment 126 is a B+Tree, and results in an append to the segment that backs the index segment 126 by going go back through the ingestion pipeline 108 to persist the offset entry into the index segment 126. Alternative index segment implementations may choose not to use a PRAVEGA segment, whereby using the ingestion pipeline 108 may not be appropriate for such alternative index segment data structures.

Further, in the example of FIG. 4, the index aggregator 132 trims the tail index 128 of any data that was persisted to the index segment 126. For example, consider that when selecting the update set U, the highest offset value is known to the index aggregator 132; the tail index 128 is thus trimmed based on this highest offset value. Note that the indexing queue 126 that provided the set U, from which the highest offset value is determined, can be a first-in, first-out queue (corresponding to the event entry appending order) that need not be trimmed.

As set forth herein, ordered streams with multiple segments can be based on ordered segments, e.g., with the position order being maintained in the index segment associated with a segment (or multiple segments). To implement an ordered stream, in one implementation as described herein, the streaming data storage system is based on stream metadata managed by the controller, scaling (e.g., autoscaling) of segments, event retention, writing the events (including dealing with scaling boundaries) and reading the events from the ordered stream.

To reiterate, in one example implementation the stream metadata is managed by the controller, with the segment metadata managed by the controller in conjunction with the segment store component. For ordered streams, the minimum and maximum position metadata values are maintained for each segment as described herein.

Figure 5:
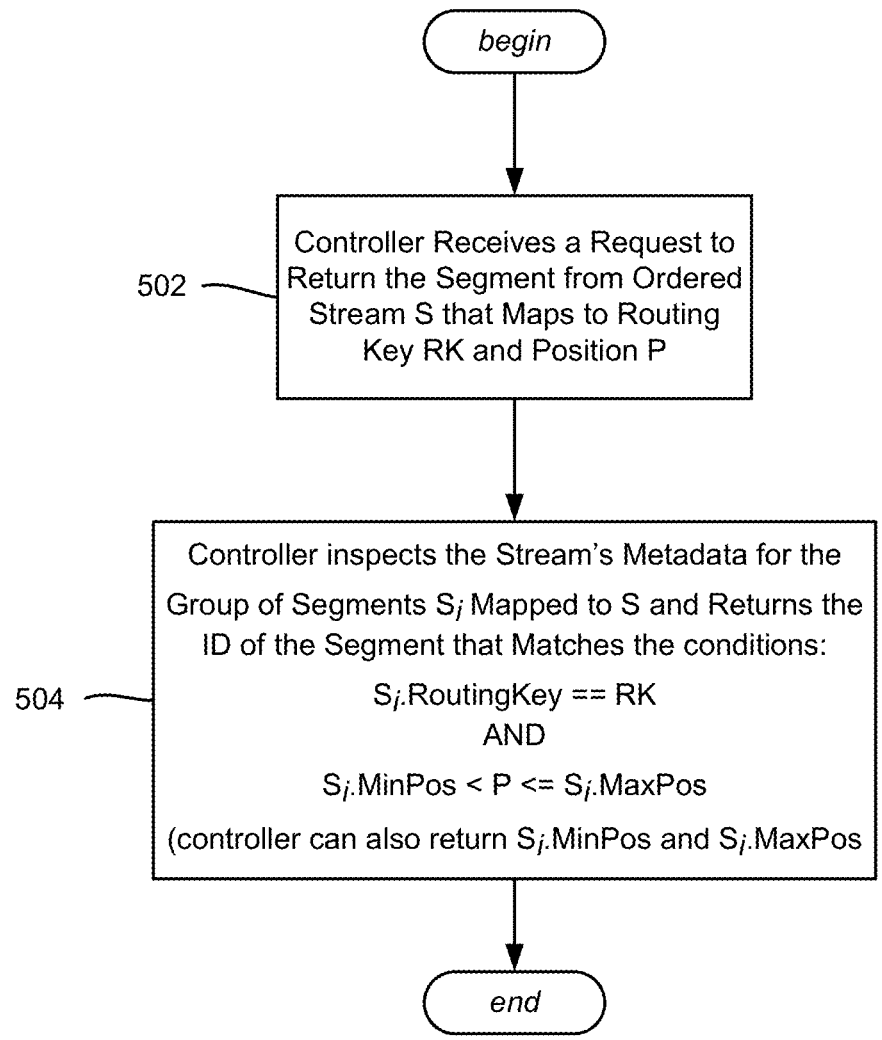
FIG. 5 is a flow diagram representing example operations of a controller component to return an ordered segment identifier based on a specified routing key and a specified position value, in accordance with various aspects and implementations of the subject disclosure.

FIG. 5 shows how the minimum and maximum position metadata values can be used to locate ordered segments within the ordered stream. At operation 502, the controller receives a request to get the segment from a specified ordered stream S that maps to a specified routing key RK and specified position P.

At operation 504, the controller inspects the segments Si (e.g., their metadata) mapped to S, and returns the segment (e.g., the segment identifier) that meets the conditions:

1. Si.RoutingKey==RK
2. Si.MinPos<P<=Si.MaxPos

That is, the segment identifier that is returned is for the segment that corresponds to the routing key space and into which the specified position fits, e.g., in FIG. 2, the append event 223 (RK corresponding to routing key space 0.3 and Position P1) maps to segment 0. This can be done by scanning through the segments' metadata, or more optimally by keeping the information in various data structures (such as a sorted tree index, for example).

As described below, instead of performing the above operation for each write, the writer can cache the segment ID along with the routing key and position information (it is feasible for the controller to return the minimum and maximum position values, or the writer can update its cache based on the specified position). Then, the system only need ensure that an event write to a specified segment ID specifies the correct segment, and if correct, allow the append to occur, otherwise reject the event write request.

As described herein, scaling determines the maximum position of a predecessor segment or segments. In one implementation, scaling is executed by the controller and is performed similarly to a scaling a regular stream, but without sealing predecessor segment(s) and with per-segment position metadata considerations.

Figure 6:
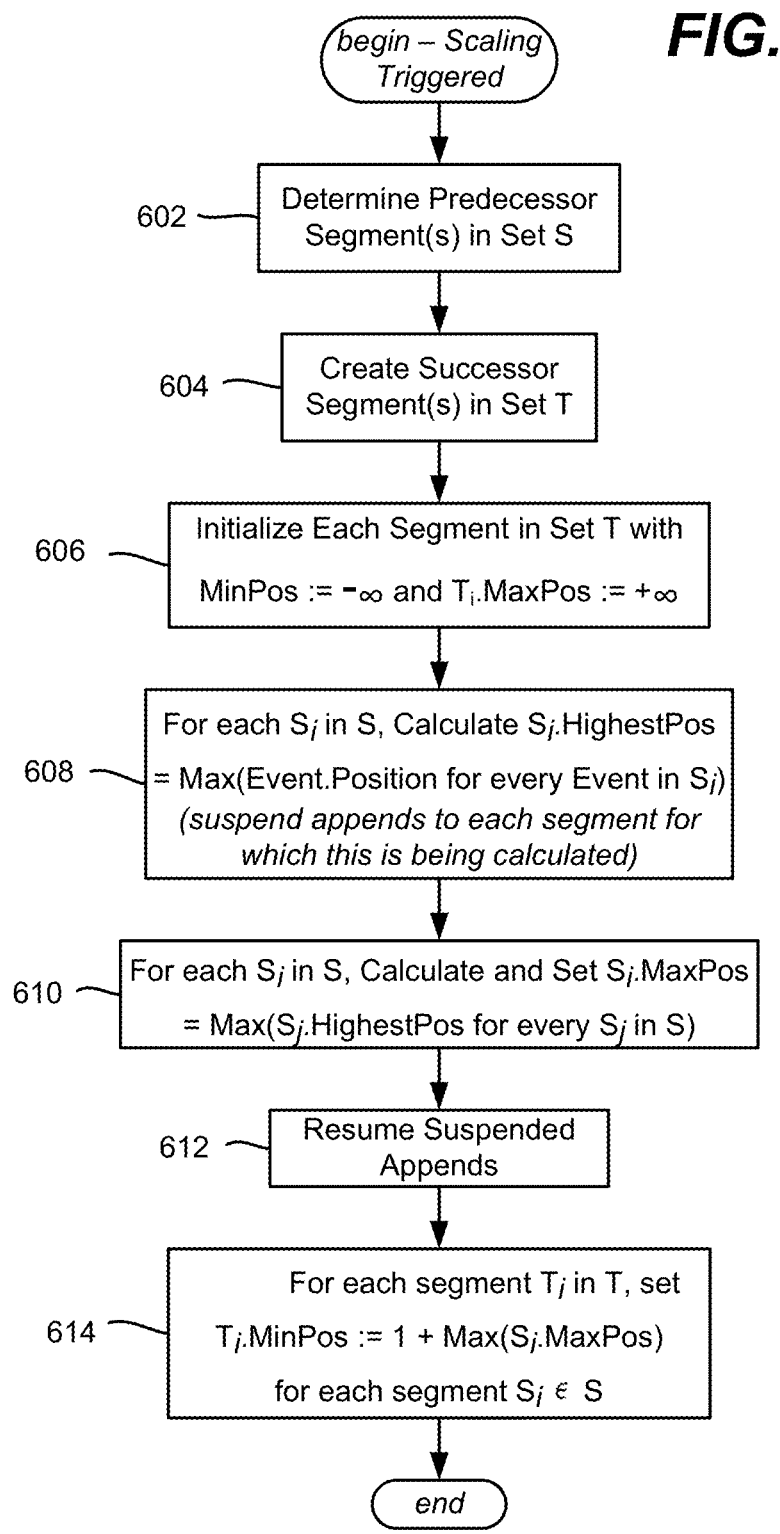
FIG. 6 is a flow diagram showing example operations related to scaling a segment, in accordance with various aspects and implementations of the subject disclosure.

As shown in FIG. 6, scaling is triggered, for example, when the event ingestion rate or throughput for a segment goes above an upper bound (a split is needed) or below a lower bound (a merge is needed). Other triggers may be used.

In FIG. 6, to be the set of one or more segments that are about to be split or merged is the set S, with the set T representing the set of segments that will result. Typically, in a typical split, there is one segment in the set S, and two segments in the set T; for a typical merge, there are two segments in the set S, and one segment in the set T. notwithstanding, it is feasible that a scale operation can be applied to a plurality of adjacent segments, which results in more than one segment so, for example, two adjacent segments can be scaled into five, three adjacent segments can be scaled into two, and so on.

Thus, operation 602 represents determining the set S of segment(s) to scale (if not already known via the triggering), and at operation 604 the controller creates the one or more segments in the set T. Segment creation is done by issuing appropriate requests from the controller to the segment store instance(s) that handle operations for each of those segments, and then having the controller update its own metadata to record the creation, e.g., including the predecessor-successor relationships and the routing key space information for the segment identifiers involved in the scaling operation.

Operation 606 initializes the minimum and maximum positions for each segment $T_i$ in T, e.g., set $T_i$.MinPos:=$-\infty$ and $T_i$.MaxPos:=$+\infty$.

At operation 608, for each segment $S_i$ in S, the controller issues a request to the segment store instance handling $S_i$ to set $S_i$.MaxPos:=Max(E.Position) for E∈{Events in $S_i$}. This means the segment's maximum position MaxPos is set to the highest position of any event in the segment $S_i$. To optimize this operation, the segment store instance(s) can keep track of the highest position per segment of each event in that segment, update this value with every append having a higher position value, and use that value in response to the controller's request.

For each segment $S_i$ in S, operation 610 calculates and sets $S_i$.MaxPos=Max($S_i$.HighestPos for every $S_j$ in S), that is, the system calculates the highest position across the predecessor set, and then sets that highest position as MaxPos for the segments in the predecessor set. For example, if one predecessor segment has a highest position value of 21, and another predecessor segment has a highest position value of 25, the highest position values for both segments in the predecessor set are set to 25.

For a merge scaling operation, between operations 608 and 610, writer(s) may request that new events be appended to the predecessor segments being scaled (merged). Because in such a situation, there are two operations involving multiple segments, operations 608 and 610 are done atomically. Thus, for example operation 608 suspends or otherwise blocks appends to the segments in the predecessor set S while the scale of those segments is in progress, and after operation 610 completes, operation 612 resumes (un-suspends) the suspended appends.

At operation 614, for each segment $T_i$ in T, the controller sets $T_i$.MinPos:=1+Max($S_i$.MaxPos) for each segment $S_i$∈S. This sets the minimum position of each segment in the successor set T to the value immediately after the maximum value of the predecessor set. Note that adding one (+1) in this operation is not necessarily adding a whole number, but rather the next higher value according to position granularity of the position values; e.g., if positions are whole numbers, then +1 adds one, if tenths of a second are used, then +1 adds a tenth of a second, if the positions are represented by 32-bit values, the 32-bit value can be incremented, and so on. Note that $T_i$.MaxPos need not be modified, as that value is updated that when the segment(s) $T_i$ in the successor set are (likely eventually) scaled.

Thus, unlike a regular stream, instead of sealing predecessor segment(s) and thereby preventing any from being appended, ordered streams are left open and associated with their minimum position and maximum position attributes. An event added to a segment, whether a predecessor or a successor thereto, is conditioned on Segment.Min Position<Event. Position<=Segment.MaxPosition. If this condition is not met, the append is rejected (with an appropriate error code), e.g., telling the writer to find out the appropriate segment and reattempt the append to the appropriate segment.

Turning to retention of events, corresponding to truncating events not under retention, truncation can be triggered in various ways (e.g., on demand from a specific request, automatically based on stream size, periodically, based on a retention policy, and so on). Described herein is truncating an ordered stream at an arbitrary position, specified by the user; (as long the events at and prior to that specified position are not subject to an enforced retention policy that blocks truncation, which is known and not described herein).

Figure 7:
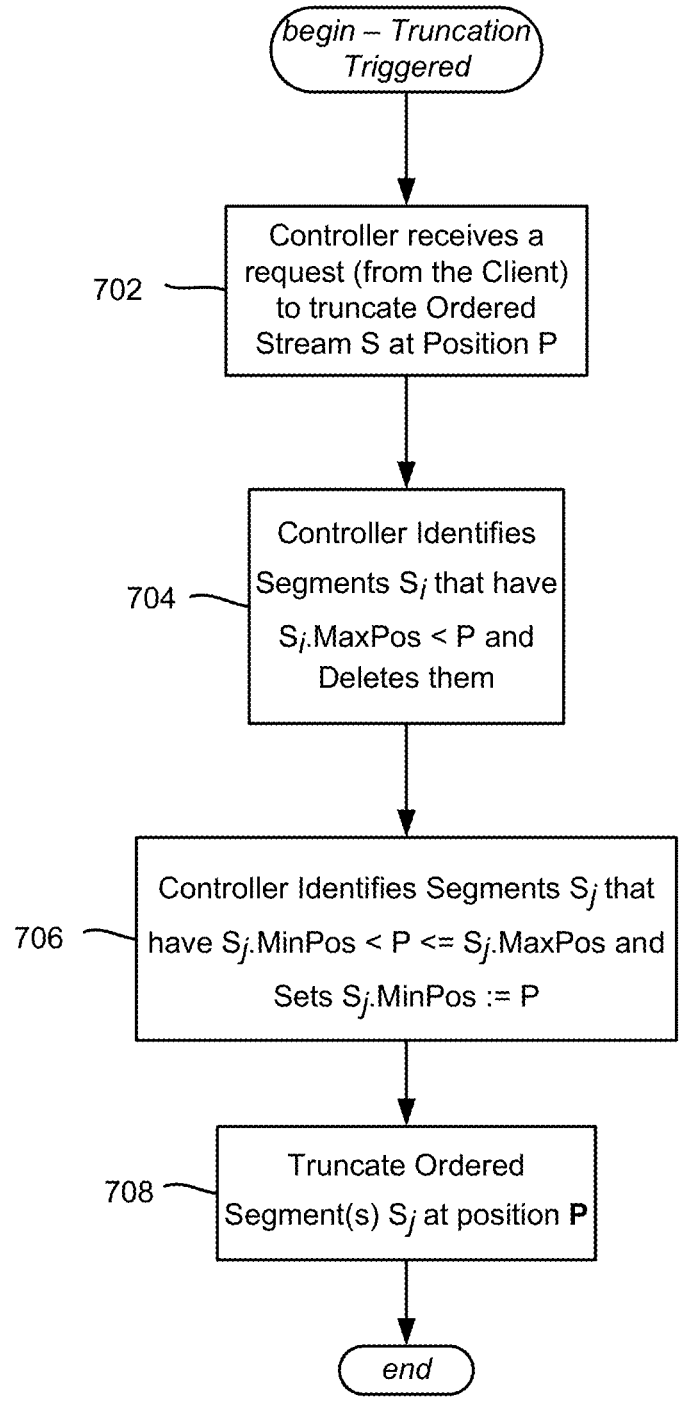
FIG. 7 is a flow diagram showing example operations related to truncating an ordered data stream based on a specified position value, in accordance with various aspects and implementations of the subject disclosure.

FIG. 7 shows example operations when the controller receives a request (e.g., from the client component) to truncate ordered stream S at position P, as represented via operation 702. At operation 704, the controller identifies a first set of the segments $S_i$ that having a maximum position below the specified position, Si.MaxPos<P and deletes those segments (if any) in the first set. This includes updating data stream metadata to no longer include those segments, updating/deleting the segment metadata/metadata structures with respect to the metadata for those segments, and so forth.

At operation 706, the controller identifies a second set of segments $S_j$ in which the specified position P is between the minimum position and the maximum position of each segment, that is $S_j$.MinPos<P<=$S_j$.MaxPos; (note that "between" as used herein can be inclusive, exclusive or partially inclusive and exclusive with respect to the bounds set by the respective minimum, maximum position metadata values for respective segments). For those segments of the second set, if any, the controller increases the minimum position values to the specified position value, and truncates events with positions less than the increased minimum value, e.g., sets $S_j$.MinPos:=P and truncates ordered segment $S_j$ at position P at operation 708. This ensures that the Events E∈$S_j$ with E.Position<P are deleted (at least logically for now). Note that actual truncation/deletion can be performed right away, or can be deferred and performed by another component(s), for example, as there are various implementations of backing data storage, whereby the physical space reclamation is dependent on how such implementations are done.

Figure 8:
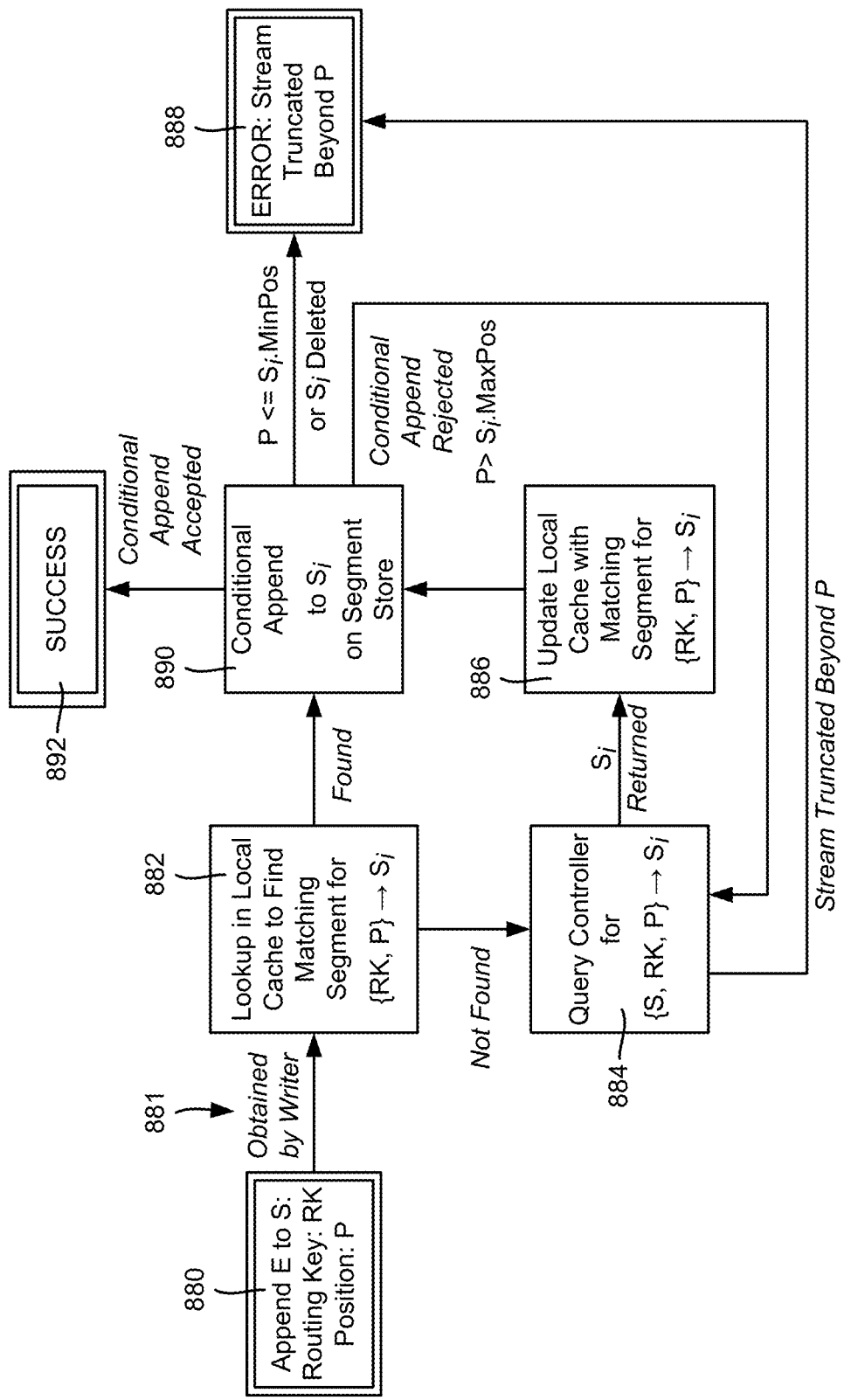
FIG. 8 is a block and dataflow diagram showing example operations and states of an event writer program, in accordance with various aspects and implementations of the subject disclosure.

Turning to appending an event to an ordered stream, FIG. 8 shows a write (append) operation attempt by a writer to an ordered stream. An event E (block 880) with routing key RK and position P is received by a writer (881) for ordered stream S; this is also shown as operation 902 of FIG. 9. In one implementation, the writer uses a local cache (represented by block 882 in FIG. 8 and operation 904 of FIG. 9) to attempt to locate (determine the segment ID of) the segment $S_i$ that {RK, P} maps to within the data stream S. Note that a regular stream writer uses a unidimensional map (RK-to-active segment), whereas an ordered stream writer needs to account for the position P as well in our case. Thus, the ordered stream writer's cache needs to account for each segment's MinPos and MaxPos (such as obtained via operation 504 of FIG. 5) in order to provide a valid answer. This cache is essentially a subset of the controller metadata described herein, and similar data structure(s) may be employed by the writer for its cache.

As shown via block 884 (FIG. 8) and operations 906 and 908 (FIG. 9), if no result can be found for {RK, P} in this cache, the writer queries the controller for the appropriate segment identifier (e.g., via FIG. 5, which can include obtaining the segment's MinPos and MaxPos values), and updates the cache before proceeding (block 886 (FIG. 8) and operations 914 and 916 (FIG. 9)). In one implementation, generally corresponding to the example operations of FIG. 5, the writer issues a request for {S, RK, P} to the controller, the controller queries its metadata to generate a response, and responds to the request. The writer updates its cache based on the response and proceeds with the event processing.

An exception to this is if S has been truncated beyond P (towards the head), and thus a valid position P no longer exists. Thus, instead of returning a segment identifier, the controller may return an error, as evaluated via operation 910 of FIG. 9, indicating that the data stream S was truncated before P; note that corresponding to such an error operation 912 rejects the event, as also represented in FIG. 8 via block 888.

Figure 9:
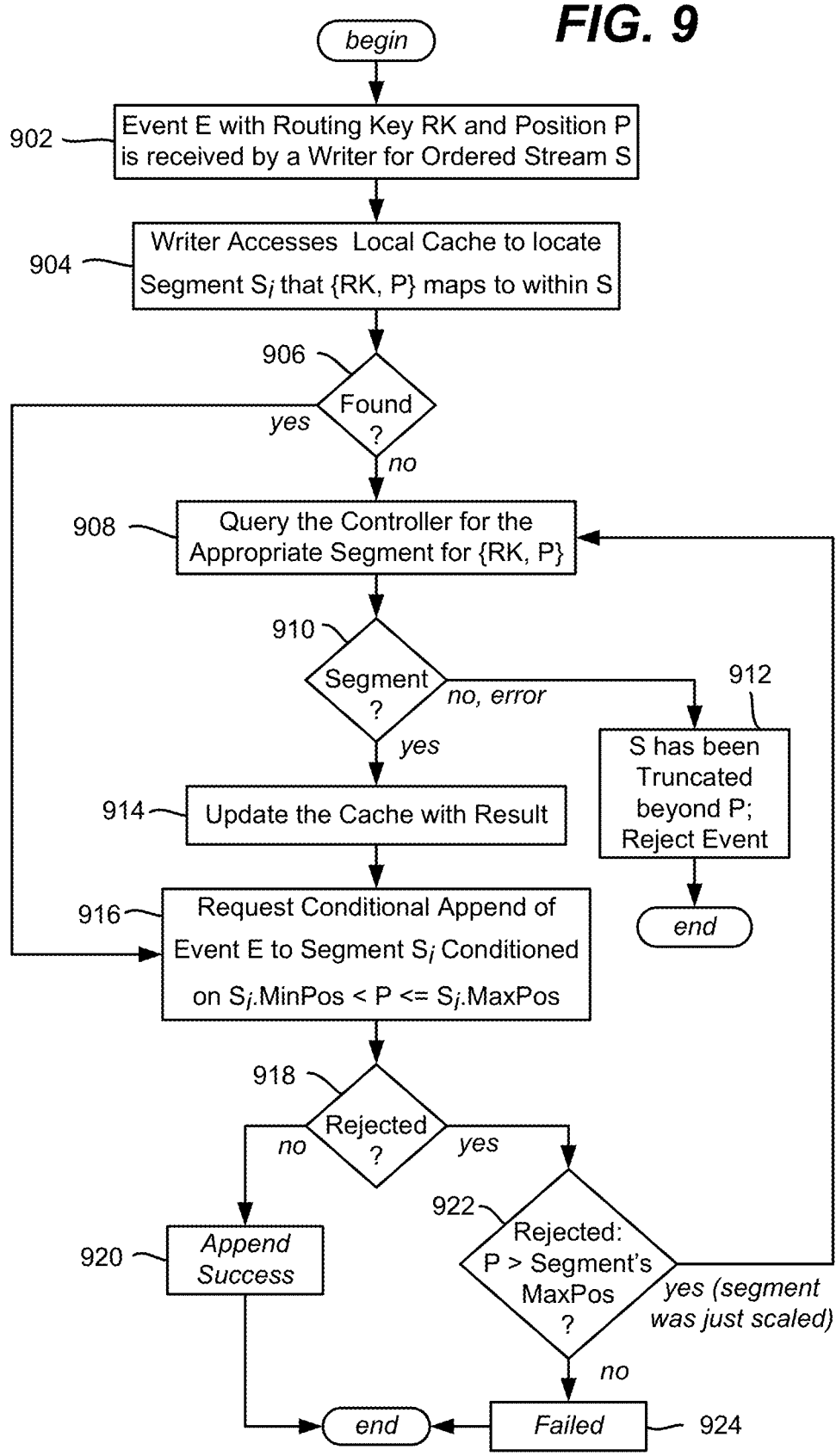
FIG. 9 is a flow diagram showing example operations of an event writer program, in accordance with various aspects and implementations of the subject disclosure.

In most scenarios, a valid segment identifier will be found in the cache or returned from the controller, whereby block 890 of FIG. 8 is reached, corresponding to operation 916 of FIG. 9. Via block 890 of FIG. 8/operation 916 of FIG. 9, the writer issues a conditional append request to segment $S_i$, conditioned on $S_i$.MinPos<P<=$S_i$.MaxPos. In general, with a conditional append, the append request will succeed if the condition is met, as represented by block 892 of FIG. 8 and operations 918 and 920 of FIG. 9, or will be failed otherwise. An alternative is to compare P relative to $S_i$.MinPos and Si.MaxPos and reject the event if the condition is not satisfied.

Various rejections can occur at operation 918, however any rejection does not mean that the append attempt cannot be retried. For example, If the append is rejected due to the specified position in the event being greater than the specified segment's maximum position, (P>$S_i$.MaxPos), this means that segment $S_i$ has recently been scaled as described herein, and the writer did not know that (e.g., its cache entry was out of date). In such a situation, the writer returns block 884 (FIG. 8) corresponding to operation 908 of FIG. 9; the controller returns the Segment $S_j$ that maps to {RK, P}, which should be different than $S_i$; (the controller should have this, as it was established during scaling). In a typical situation in which the different segment $S_j$ is returned, repeating the previous operations (the writer updates the cache, attempts another append) after substituting $S_j$ for $S_i$, the writer again reaches block 890 (FIG. 9)/operation 918 (FIG. 9) to reattempt the append with the newly obtained segment identifier.

As shown via block 922, if the append is rejected, e.g., due to the position P being less than the segment's minimum position value (P<=$S_i$.MinPos), or because $S_i$ has been deleted, then this means that the stream has been truncated at a position P'>P, and the append attempt is rejected with the appropriate error (block 888 of FIG. 8, operation 924 of FIG. 9).

Turning to reading events from an ordered stream, reading events can be done in multiple ways, including in the order in which they were appended, or based on position order. Thus, existing reader applications and the APIs that allow access to a stream still continue to work with an ordered data stream, including for reading the current set of events in append order and also by "tailing" the segment (reading events as soon as they are appended to the segment).

In the case of ordered streams, a typical read operation (which is unlike a read from regular streams) is one where a reader wants to get the events between two arbitrary positions, in the order specified by each event's position. Note the reader may be only interested in a subset of routing keys (e.g., only read information about a "device-id").

Figure 10:
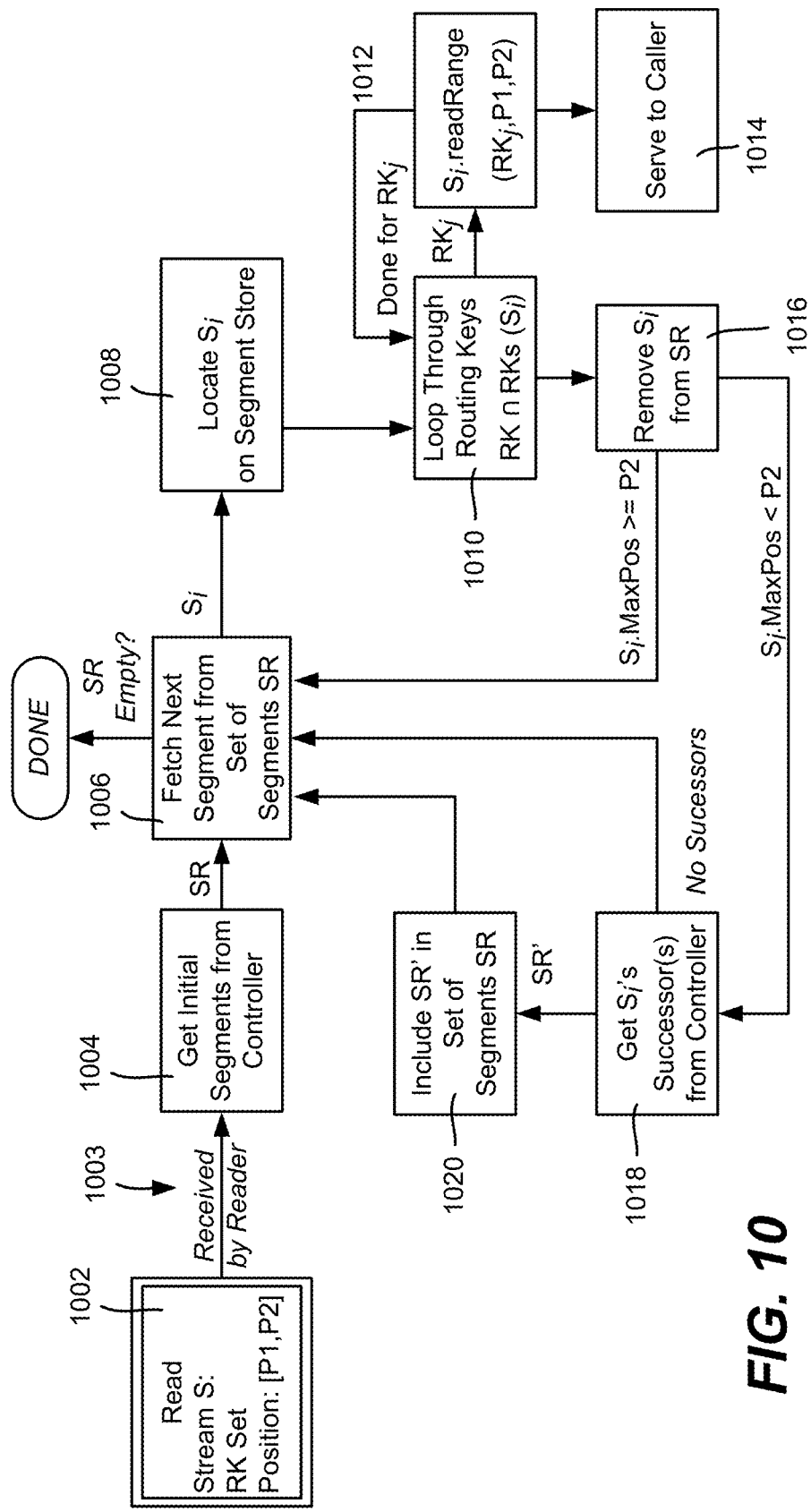
FIG. 10 is a block and dataflow diagram showing example operations and states of an event reader program, in accordance with various aspects and implementations of the subject disclosure.

FIG. 10 shows an example in which a reader (event consumer) wants to read the events between positions P1 and P2 (where P1<=P2) for routing keys in the (optional) set RK from ordered stream S. This is represented by block 1002 in FIG. 10 being received by a reader 1003. Note that in one implementation, P1 can be unspecified or P1==−∞, in which situation the events from data stream S are read from the beginning. Similarly, if P2 is unspecified or P2==+∞, then the events from data stream S are read until the current end of the stream is reached. If RK is unspecified (e.g., the set is empty), one implementation of the system assumes the reader wants to read events from all routing keys.

The reader issues a request to the controller to locate the segment(s) overlapping P1 and filter based on routing keys in RK; this is represented by block 1004. The controller obtains a set of segments SR from S, such that, for every Segment Si∈SR, $S_i$.MinPos<P1<=$S_i$.MaxPos, and RoutingKeys ($S_i$)∩RK≠∅. As described above, if RK is empty, this latter constraint is ignored (i.e., events from all routing keys are to be read). If RK is not empty, the controller will also return the matching RKs for this segment.

The reader begins reading from the segments in SR. To this end, as long as SR is not empty, at block 1008 the reader picks a segment $S_i$ from SR and locates the selected segment $S_i$ on its segment store index. Then, as represented by block 1010, for each $RK_j$ in the routing keys for this segment, (RoutingKeys($S_i$)∩RK), the reader issues a request of the form $S_i$.readRange($RK_j$, P1, P2) to the segment store that owns $S_i$, as represented by block 1012.

The ordered segment $S_i$ locates and returns the data efficiently using the index segment for this segment, as well as the segment's tail index, as previously described with reference to FIG. 4. As set forth above, positions may be interleaved across multiple routing keys within the same ordered segment using the sorted index (that concatenates routing key and position when generating the index keys), which makes looking up the positions for a routing key a simple range search via the sorted index and/or the tail index.

As events are being returned from the read range request, they are served to the calling application for consumption (i.e., no buffering is required), as represented by block 1014. Note that a possible optimization is to send requests in parallel or by providing the whole set (or larger subset) of the routing keys to extract, in a single API call.

Note that if RK is empty (no routing key filters from the user), then the reader may issue a simple $S_i$.readRange(P1, P2), which should return events for all routing keys within $S_i$.

When $S_i$ has been fully read, at block 1016 the reader removes $S_i$ from the segment set SR. Then, if $S_i$.MaxPos>=P2, the reader process returns to block 1006 as described above, for the next segment, and so on, until no segments remain in SR.

Conversely, if $S_i$.MaxPos<P2, then at block 1018 the reader queries the controller for S/s successor(s) that match the routing key overlap condition described above. The controller looks up the result in the controller's predecessor/successor metadata, and if there are any successor(s) in a set SR', the successors of $S_i$ are added to SR at block 1020 (SR is now the union of the sets SR and SR'). The reader returns to block 1006 to select the next segment to read from, until no segments remain to be read.

FIG. 10 illustrates how a single reader can execute a read request. This reader process satisfies the per-routing-key ordering guarantee in that the controller inspects the segments $S_i$ mapped to the data stream S and returns the one that meets the Si.RoutingKey==RK and Si.MinPos<P<=Si.MaxPos conditions. In this example, a reader reads from a single (ordered) segment at any given time, and because a routing key does not span more than one segment at any given time, and because the ordered segment returns events in position order, that same order is applied to the end result.

Across segments, the example process only adds a segment's successor segment to the segment set after the reader has fully consumed the relevant events within that (predecessor) segment. Whether or not the reader processes other segments in the meantime (by looping through SR) does not matter, because those other segments contain other routing keys, and alternating between events from different routing keys still satisfies the ordering guarantee because the events within a single routing key are returned in order. Note that any implementation of reader needs to make sure that the segment set SR is a first-in-first-out data structure, (otherwise the above points may not hold).

The data streaming storage system offers the ability to read streams in parallel, by multiple readers in parallel that are part of a reader group). This process needs for the readers within a reader group synchronize to between themselves as to which reader reads from which segment, which is a known technology, and does not allow more than a single reader to own the same segment at any given time.

For an ordered stream, the process seeds the reader group with initial segments (as done via block 1004 of FIG. 10), and ending the read from a segment once an event with position exceeding P2 is encountered. The process does not move onto a successor segment if the ending position (P2) is wholly contained within the segment currently being read from.

In terms of performance, because older segments can be modified in an ordered stream, appending events is not as efficient as appending events to only active segments, as in a conventional data stream (unless all events coincidentally arrive in order of positions). In general ordered streams are for scenarios in which events arrive mostly in position order, but occasionally do not, which is a reason that the logic of finding the "correct" segment for an event based on position is provided herein. In this scenario, most of the time the writer is able to append new events to the current "active" (most recent successor segments), but when a segment is scaled, there may be some jumping back to a predecessor segment to backfill out-of-order events. This temporary instability tends to subside as time passes by. Note that ordered streams are not for scenarios in which events have completely arbitrary positions or positions in strict descending order, because in such scenarios the initial scale epoch will likely contain the entire span of available positions, whereby any scale event afterwards will cause new events to be back-filled into the first epoch.

Figure 11:
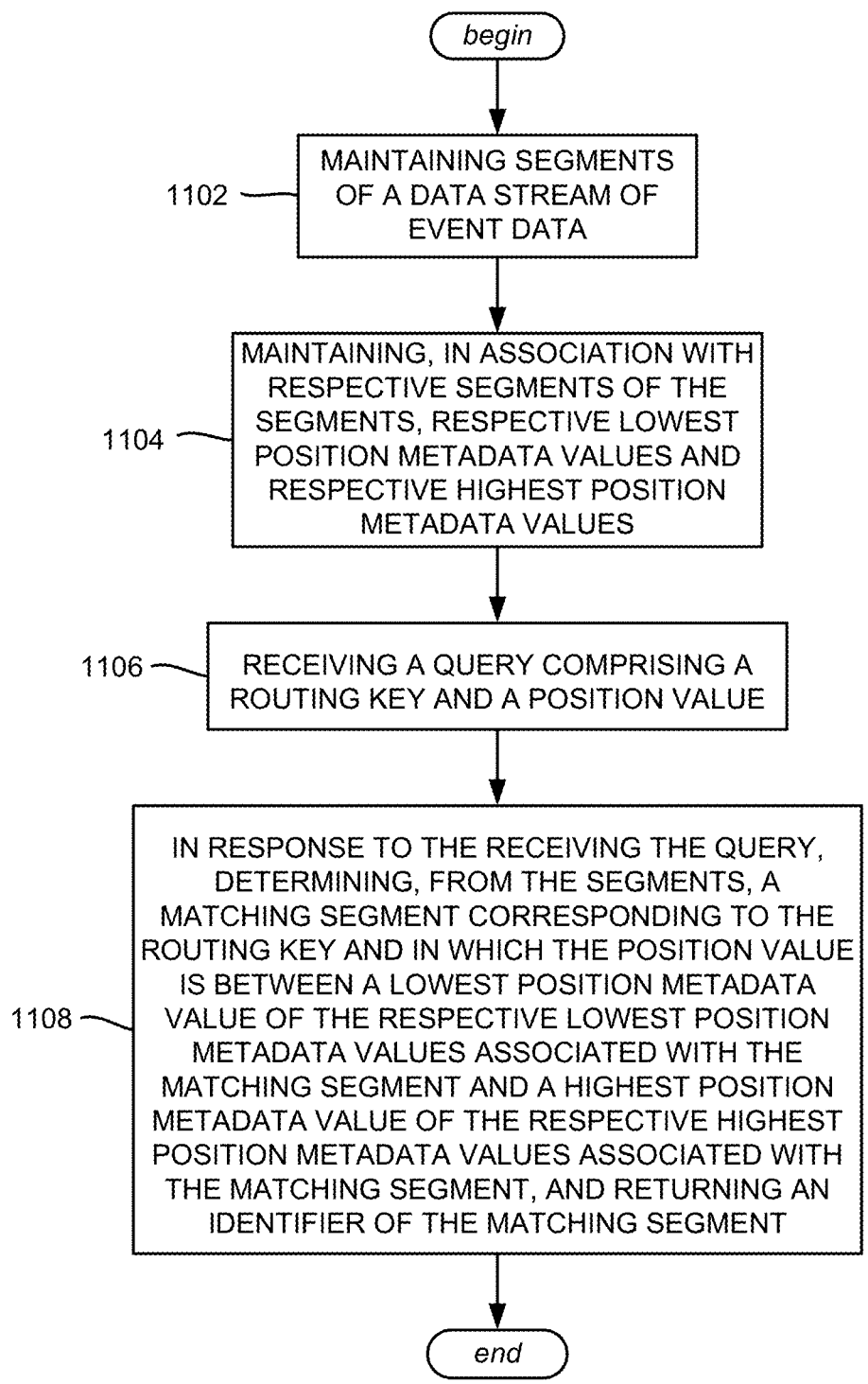
FIG. 11 is a flow diagram showing example operations related to determining and returning an identifier of a segment that matches a specified routing key and specified position value, in accordance with various aspects and implementations of the subject disclosure.

One or more aspects can be embodied in a system, such as represented in FIG. 11 and for example can comprise a memory that stores computer executable components and/or operations, and a processor that executes computer executable components and/or operations stored in the memory. Example operations can comprise operation 1102, which represents maintaining segments of a data stream of event data. Operation 1104 represents maintaining, in association with respective segments of the segments, respective lowest position metadata values and respective highest position metadata values. Operation 1106 represents receiving a query comprising a routing key and a position value. Operation 1108 represents, in response to the receiving the query, determining, from the segments, a matching segment corresponding to the routing key and in which the position value is between a lowest position metadata value of the respective lowest position metadata values associated with the matching segment and a highest position metadata value of the respective highest position metadata values associated with the matching segment, and returning an identifier of the matching segment.

Further operations can comprise scaling the matching segment as part of a scaling operation from a predecessor segment set to a successor segment set, comprising creating a new segment for the successor set and using a highest position metadata value associated with the predecessor segment set as a basis for the lowest position metadata value associated with the new segment. The predecessor segment set can contain more segments than the successor segment set, the matching segment can be in the predecessor set, and further operations can comprise appending an event to the matching segment. The predecessor segment set can contain fewer segments than the successor segment set, the matching segment can be in the predecessor set, and further operations can comprise appending event data to the matching segment.

Further operations can comprise receiving a request to append an event payload to the matching segment, the request comprising the identifier of the matching segment, a specified position value, and the event payload, and, in response to the request, determining whether the specified position value is between the lowest position metadata value associated with the matching segment and the highest position metadata value associated with the matching segment, and in response to determining that the specified position value is between the lowest position metadata value associated with the matching segment and the highest position metadata value associated with the matching segment, appending the event payload to the matching segment, and maintaining position-related data associated with the event payload to maintain a positioning order based on the position value of the event payload relative to position values of other event payloads other than the event payload.

The request to append can comprise a conditional append request conditioned on the specified position value being between the lowest position metadata value associated with the matching segment and the highest position metadata value associated with the matching segment.

Receiving the query can comprise receiving a request from a writer application, determining the matching segment can comprise scanning a data structure comprising, for respective segment identifiers, respective routing key space data, the respective lowest position metadata values and the respective highest position metadata values to obtain the segment identifier of the matching segment.

Further operations can comprise receiving a read request for events between a range of positions, determining, based on the range of positions, that the matching segment contains events corresponding to the read request, determining that a successor segment to the matching segment contains events corresponding to the read request, and returning the events in response to the read request in position order from the matching segment and the successor segment.

Further operations can comprise receiving a truncate request to truncate events based on a specified position, and in response to the truncate request, determining a first set of segments in which respective first segments of the first set are associated with respective first highest metadata position values that are less than the specified position, and truncating the respective first segments, and determining a second set of segments in which respective second segments of the second set are associated with respective second lowest metadata position values that are less than the specified position and with respective metadata position values that are not less than the specified position, and updating the respective second lowest metadata position values of the respective second segments to equal the specified position.

Figure 12:
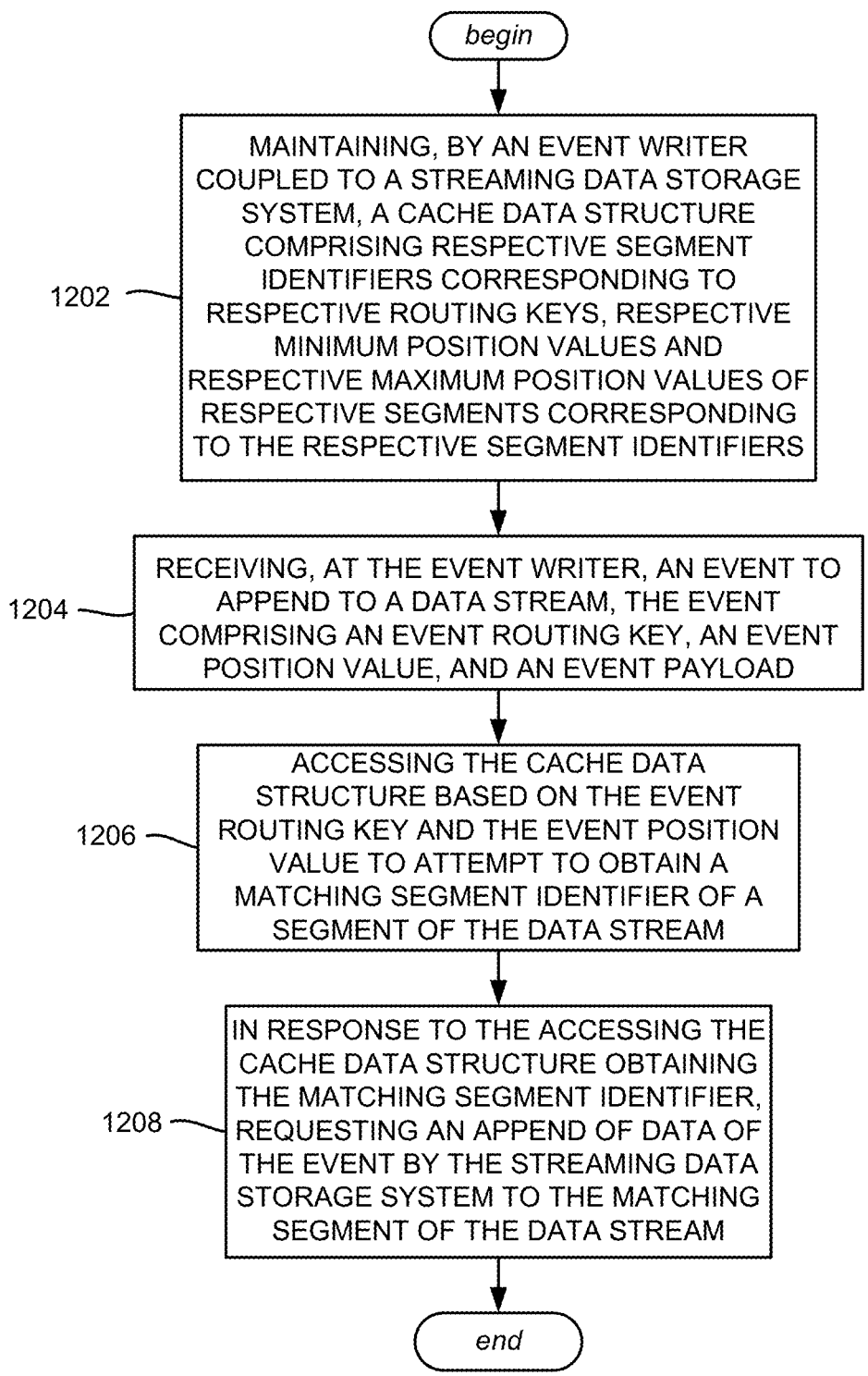
FIG. 12 is a flow diagram showing example operations related to appending an event to an event segment based on position data, in accordance with various aspects and implementations of the subject disclosure.

One or more aspects can be embodied in a system, such as represented in FIG. 12, and for example can comprise a memory that stores computer executable components and/or operations, and a processor that executes computer executable components and/or operations stored in the memory. Example operations can comprise operation 1202, which represents maintaining, by an event writer coupled to a streaming data storage system, a cache data structure comprising respective segment identifiers corresponding to respective routing keys, respective minimum position values and respective maximum position values of respective segments corresponding to the respective segment identifiers. Operation 1204 represents receiving, at the event writer, an event to append to a data stream, the event comprising an event routing key, an event position value, and an event payload. Operation 120 represents accessing the cache data structure based on the event routing key and the event position value to attempt to obtain a matching segment identifier of a segment of the data stream. Operation 1208 represents, in response to the accessing the cache data structure, obtaining the matching segment identifier, requesting an append of data of the event by the streaming data storage system to the matching segment of the data stream.

Further operations can comprise, in response to the accessing the cache not obtaining the matching segment identifier, requesting the matching segment identifier from the streaming data storage system based on the event routing key and the event position value, receiving the matching segment identifier in response to the request for the matching segment identifier, updating the cache based on the matching segment identifier, and requesting an append of data of the event by the streaming data storage system to the matching segment of the data stream.

The request can be a conditional append request based on the position value being less than or equal to a maximum position value of the matching segment, and further operations can comprise receiving a rejection in response to the requesting the append, evaluating the rejection to determine whether the rejection was based on the position value being greater than the maximum position value of the matching segment, and, in response to the rejection being based on the position value being greater than the maximum position value of the matching segment, requesting an updated matching segment identifier corresponding to an updated matching segment from the streaming data storage system based on the event routing key and the event position value, receiving the updated matching segment identifier in response to the request, updating the cache based on the updated matching segment identifier, and requesting an append of the data of the event by the streaming data storage system to the updated matching segment of the data stream.

Figure 13:
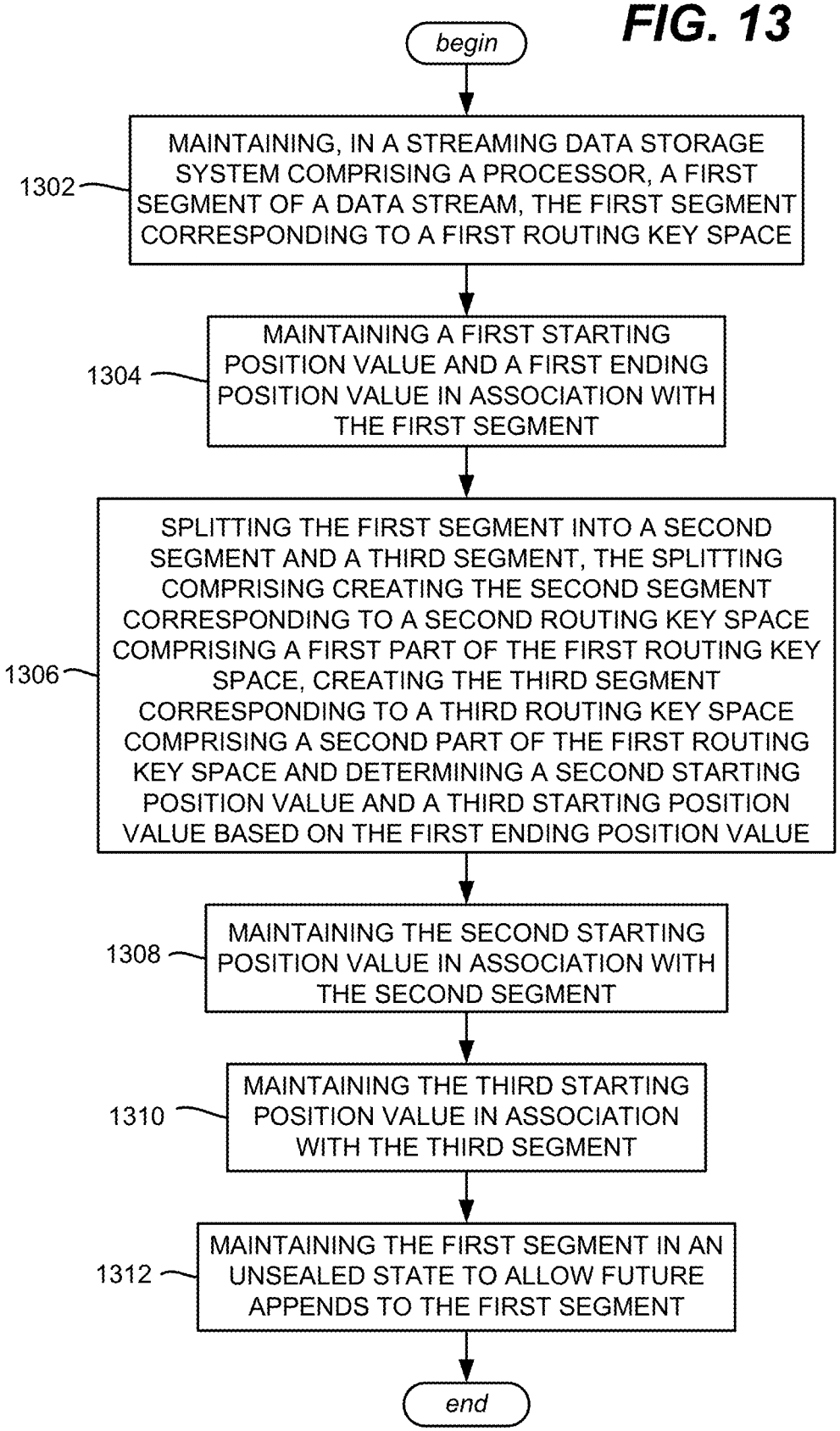
FIG. 13 is a flow diagram showing example operations related to scaling an event segment that is associated with starting and ending event position data, in accordance with various aspects and implementations of the subject disclosure.

One or more example aspects, such as corresponding to example operations of a method, are represented in FIG. 13. Operation 1302 represents maintaining, in a streaming data storage system comprising a processor, a first segment of a data stream, the first segment corresponding to a first routing key space. Operation 1304 represents maintaining a first starting position value and a first ending position value in association with the first segment. Operation 1306 represents splitting the first segment into a second segment and a third segment, the splitting comprising creating the second segment corresponding to a second routing key space comprising a first part of the first routing key space, creating the third segment corresponding to a third routing key space comprising a second part of the first routing key space, and determining a second starting position value and a third starting position value based on the first ending position value. Operation 1308 represents maintaining the second starting position value in association with the second segment. Operation 1310 represents maintaining the third starting position value in association with the third segment. Operation 1312 represents maintaining the first segment in an unsealed state to allow future appends to the first segment.

Aspects can comprise receiving a request for a segment identifier, the request comprising a routing key and a specified position value, determining, based on the routing key and the specified position value, that the first segment corresponds to the routing key space and that the specified position is between the first starting position value and the first ending position value, and returning a first identifier of the first segment.

Aspects can comprise receiving a request to append an event, the request specifying the first identifier and the specified position, in response to the request, determining whether the specified position is greater than the first ending position value, and, in response to determining that the specified position is not greater than the first ending position value, appending data of the event to the first segment.

Aspects can comprise merging the second segment and the third segment into a fourth segment; the merging can comprise creating the fourth segment corresponding to a fourth routing key space that comprises the second routing key space and the third routing key space, and determining a fourth starting position value based on a greater value of the second ending position value and the third ending position value, maintaining the fourth starting position value in association with the fourth segment, maintaining the second segment in the unsealed state to allow future appends to the second segment, and maintaining the third segment in the unsealed state to allow future appends to the third segment.

Aspects can comprise determining whether the second ending position value is greater than the third ending position value, in response to determining that the second ending position value is greater than the third ending position value, updating the third ending position value with the second position value, and, in response to determining that the second ending position value is not greater than the third ending position value, updating the second ending position value with the third position value.

Aspects can comprise receiving a request for a segment identifier, the request comprising a routing key and a specified position value, determining, based on the routing key and the specified position value, that the second segment corresponds to the routing key space and that the specified position is between the second starting position value and the second ending position value, and returning a second identifier of the second segment in response to the request for the segment identifier.

Aspects can comprise receiving a request to append an event, the request specifying the second identifier and the specified position, in response to the request, determining whether the specified position is greater than the second ending position value, and, in response to determining that the specified position is not greater than the second ending position value, appending data of the event to the second segment.

Aspects can comprise receiving a conditional request to append an event, the conditional request specifying the second identifier and the specified position, and being conditioned on the specified position not being greater than the second ending position value, and in response to the request, determining whether the specified position is greater than the second ending position value, and in response to determining that the specified position is not greater than the second ending position value, appending data of the event to the second segment, and in response to determining that the specified position is greater than the second ending position value rejecting the conditional request to append the event.

The technology for reordering events within a dynamically-scaling ordered data stream made of multiple individual ordered segments, based on user-specified position data is practical to implement and has multiple possible applications.

One application for ordered streams is the concept of time series streams. Similar to a time series database, a time series stream is an ordered stream with time as the user-provided event position. For example, the event position can be a timestamp, which can be generated by the producer when the event is created or it can be assigned by the streaming data storage system at ingestion time. By appending such events (with time) to an ordered stream, then that whole stream contains such events in their naturally occurring time order. This likely simplifies a potential upstream application that indexes by time (e.g., a general purpose time series database) or displays information using a time scale. Such applications need not be concerned with reordering out-of-order events because that as already done via the technology described herein. Further, such applications need not perform buffering to handle late-arriving events; they can issue queries against the ordered stream for data between two time stamps and read the events in their natural order.

If each event position is a timestamp (current time, elapsed time since a known point in time, or the like), an ordered segment can effectively sort the events by this time position and have the events be read in chronological order, irrespective of when they were written. Note that in many types of systems, requests are often delayed and often arrive out of order, whereby the technology described herein can provide benefits such situations. For example, slightly out-of-order events can be appended because of clock skew between producers, network delays, connectivity issues and the like.

Figure 14:
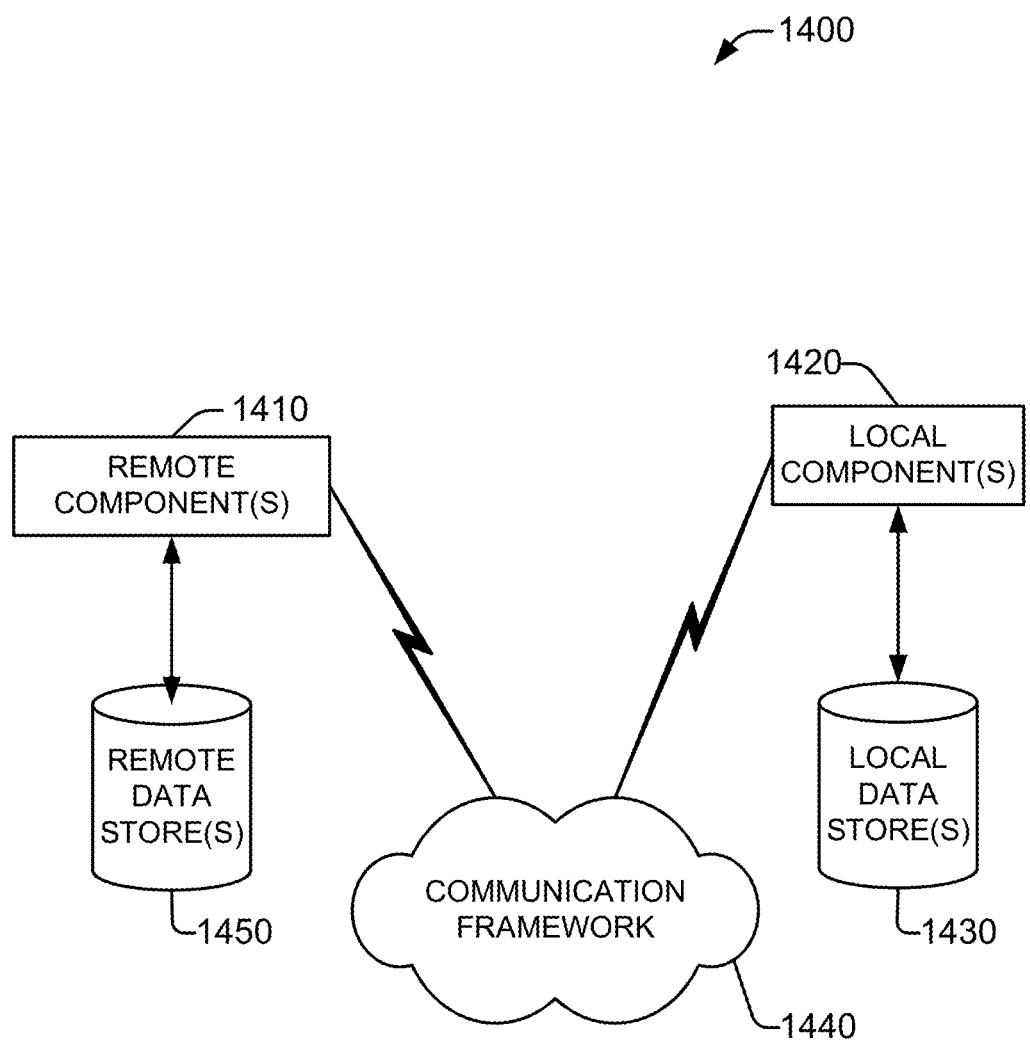
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
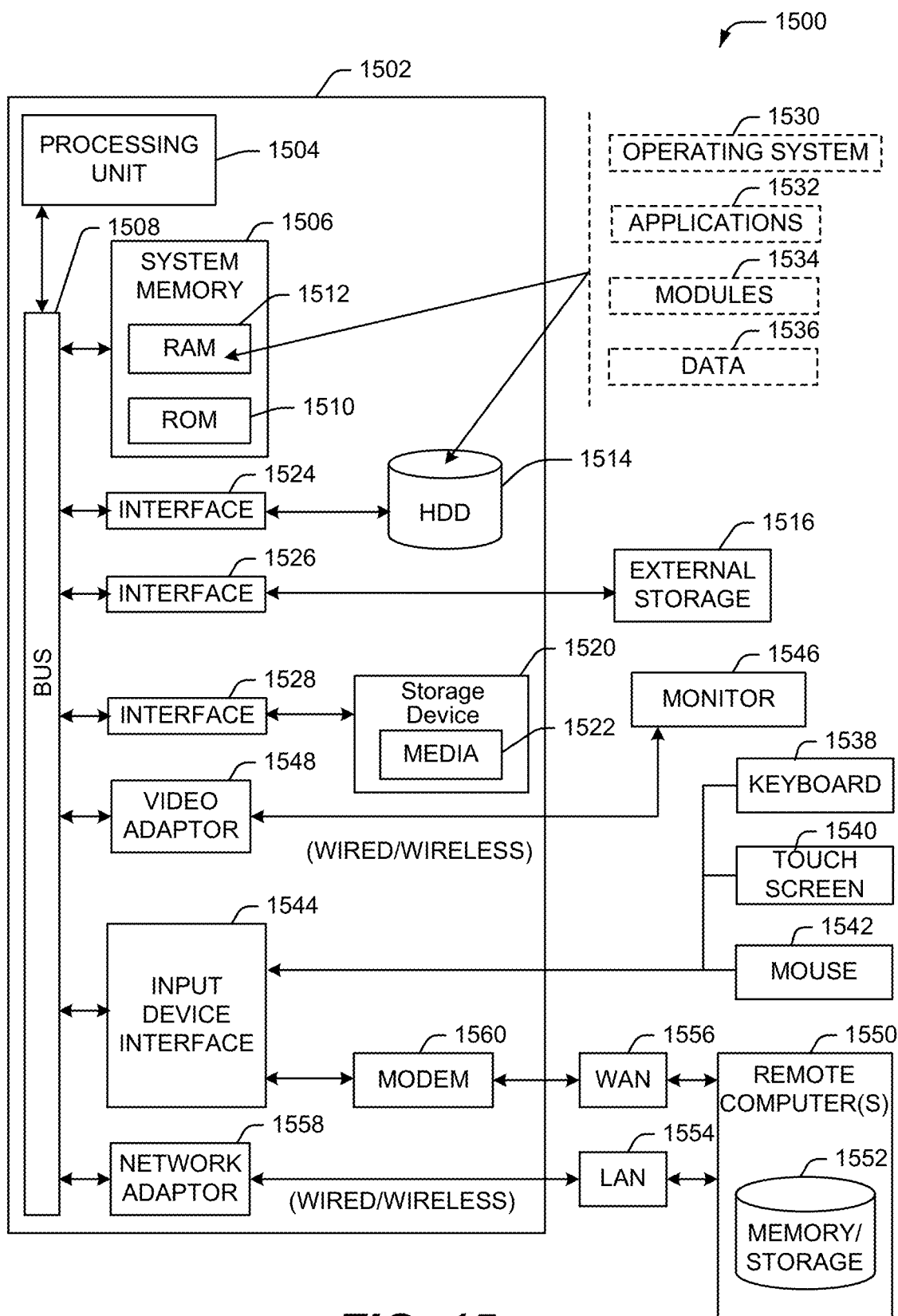
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
    a processor; and
    a memory that stores executable instructions that, when executed by the processor, facilitate performance of operations, the operations comprising:
        maintaining segments of a data stream of event data;
        maintaining, in association with respective segments of the segments, respective lowest position metadata values and respective highest position metadata values;
        receiving a query comprising a routing key and a position value;
        in response to the receiving the query, determining, from the segments, a matching segment corresponding to the routing key and in which the position value is between a lowest position metadata value of the respective lowest position metadata values associated with the matching segment and a highest position metadata value of the respective highest position metadata values associated with the matching segment, and returning an identifier of the matching segment;
        receiving a request to append an event payload to the matching segment, the request comprising the identifier of the matching segment, a specified position value, and the event payload, wherein the request to append comprises a conditional append request conditioned on the specified position value being between the lowest position metadata value associated with the matching segment and the highest position metadata value associated with the matching segment; and
        in response to the request,
            determining whether the specified position value is between the lowest position metadata value associated with the matching segment and the highest position metadata value associated with the matching segment, and
            in response to determining that the specified position value is between the lowest position metadata value associated with the matching segment and the highest position metadata value associated with the matching segment,
                appending the event payload to the matching segment, and
                maintaining position-related data associated with the event payload to maintain a positioning order based on the position value of the event payload relative to position values of other event payloads other than the event payload.

2. The system of claim 1, wherein the operations further comprise scaling the matching segment as part of a scaling operation from a predecessor segment set to a successor segment set, comprising creating a new segment for the successor set and using a predecessor highest position metadata value associated with the predecessor segment set as a basis for the lowest position metadata value associated with the new segment.

3. The system of claim 2, wherein the predecessor segment set contains more segments than the successor segment set, wherein the matching segment is in the predecessor set, and wherein the operations further comprise appending an event to the matching segment.

4. The system of claim 2, wherein the predecessor segment set contains fewer segments than the successor segment set, wherein the matching segment is in the predecessor set, and wherein the operations further comprise appending event data to the matching segment.

5. The system of claim 1, wherein the receiving the query comprises receiving a request from a writer application, and wherein the determining the matching segment comprises scanning a data structure comprising, for respective segment identifiers, respective routing key space data, the respective lowest position metadata values and the respective highest position metadata values to obtain the identifier of the matching segment.

6. The system of claim 1, wherein the operations further comprise receiving a read request for events between a range of positions, determining, based on the range of positions, that the matching segment contains events corresponding to the read request, determining that a successor segment to the matching segment contains events corresponding to the read request, and returning the events in response to the read request in position order from the matching segment and the successor segment.

7. The system of claim 1, wherein the operations further comprise receiving a truncate request to truncate events based on a specified position, and in response to the truncate request,
   determining a first set of segments in which respective first segments of the first set are associated with respective first highest metadata position values that are less than the specified position, and truncating the respective first segments, and
   determining a second set of segments in which respective second segments of the second set are associated with respective second lowest metadata position values that are less than the specified position and with respective metadata position values that are not less than the specified position, and updating the respective second lowest metadata position values of the respective second segments to equal the specified position.

8. A system, comprising:
   a processor; and
   a memory that stores executable instructions that, when executed by the processor, facilitate performance of operations, the operations comprising:
      maintaining, by an event writer coupled to a streaming data storage system, a cache data structure comprising respective segment identifiers corresponding to respective routing keys, respective minimum position values and respective maximum position values of respective segments corresponding to the respective segment identifiers;
      receiving, at the event writer, an event to append to a data stream, the event comprising an event routing key, an event position value, and an event payload;
      accessing the cache data structure based on the event routing key and the event position value to attempt to obtain a matching segment identifier of a segment of the data stream;
      in response to the accessing the cache data structure obtaining the matching segment identifier, requesting an append of data of the event by the streaming data storage system to the matching segment of the data stream, wherein the requesting the append comprises making a conditional append request based on the event position value being less than or equal to a maximum position value of the matching segment;
      receiving a rejection in response to the requesting the append;
      evaluating the rejection to determine whether the rejection was based on the position value being greater than the maximum position value of the matching segment; and
      in response to the rejection being based on the position value being greater than the maximum position value of the matching segment,
         requesting an updated matching segment identifier corresponding to an updated matching segment from the streaming data storage system based on the event routing key and the event position value,
         receiving the updated matching segment identifier in response to the requesting the updated matching segment identifier,
         updating the cache based on the updated matching segment identifier, and
         requesting the append of the data of the event by the streaming data storage system to the updated matching segment of the data stream.

9. The system of claim 8, wherein the operations further comprise, in response to the accessing the cache not obtaining the matching segment identifier, requesting the matching segment identifier from the streaming data storage system based on the event routing key and the event position value, receiving the matching segment identifier in response to the request for the matching segment identifier, updating the cache based on the matching segment identifier, and requesting the append of the data of the event by the streaming data storage system to the matching segment of the data stream.

10. The system of claim 8, wherein the operations further comprise scaling the matching segment as part of a scaling operation from a predecessor segment set to a successor segment set.

11. The system of claim 10, wherein the scaling the matching segment comprises creating a new segment for the successor set.

12. The system of claim 11, wherein the scaling the matching segment further comprises using a predecessor highest position metadata value associated with the predecessor segment set as a basis for the lowest position metadata value associated with the new segment.

13. The system of claim 12, wherein the predecessor segment set contains more segments than the successor segment set, and wherein the matching segment is in the predecessor set.

14. The system of claim 12, wherein the predecessor segment set contains fewer segments than the successor segment set, and wherein the matching segment is in the predecessor set.

15. The system of claim 8, wherein the writer application comprises a streaming application that at least one of processes or creates streaming data.

16. The system of claim 8, wherein the operations further comprise receiving a truncate request to truncate events based on a specified position, and in response to the truncate request,
   determining a first set of segments in which respective first segments of the first set are associated with respective first highest metadata position values that are less than the specified position, and truncating the respective first segments, and
   determining a second set of segments in which respective second segments of the second set are associated with respective second lowest metadata position values that are less than the specified position and with respective metadata position values that are not less than the specified position, and updating the respective second lowest metadata position values of the respective second segments to equal the specified position.

17. A method, comprising:
   maintaining, in a streaming data storage system comprising a processor, a first segment of a data stream, the first segment corresponding to a first routing key space;
   maintaining a first starting position value and a first ending position value in association with the first segment;

splitting the first segment into a second segment and a third segment, the splitting comprising creating the second segment corresponding to a second routing key space comprising a first part of the first routing key space, creating the third segment corresponding to a third routing key space comprising a second part of the first routing key space, and determining a second starting position value and a third starting position value based on the first ending position value;

maintaining the second starting position value in association with the second segment;

maintaining the third starting position value in association with the third segment;

maintaining the first segment in an unsealed state to allow appends to the first segment;

merging the second segment and the third segment into a fourth segment, the merging comprising creating the fourth segment corresponding to a fourth routing key space that comprises the second routing key space and the third routing key space, and determining a fourth starting position value based on a greater value of the second ending position value and the third ending position value;

maintaining the fourth starting position value in association with the fourth segment;

maintaining the second segment in the unsealed state to allow future appends to the second segment;

maintaining the third segment in the unsealed state to allow future appends to the third segment;

receiving a request for a segment identifier, the request comprising a routing key and a specified position value;

determining, based on the routing key and the specified position value, that the second segment corresponds to the routing key space and that the specified position is between the second starting position value and the second ending position value;

returning a second identifier of the second segment in response to the request for the segment identifier;

receiving a conditional request to append an event, the conditional request specifying the second identifier and the specified position, and being conditioned on the specified position not being greater than the second ending position value, and in response to the request, determining whether the specified position is greater than the second ending position value;

in response to determining that the specified position is not greater than the second ending position value, appending data of the event to the second segment; and in response to determining that the specified position is greater than the second ending position value, rejecting the conditional request to append the event.

18. The method of claim 17, further comprising receiving a request for a segment identifier, the request comprising a routing key and a specified position value, determining, based on the routing key and the specified position value, that the first segment corresponds to the routing key space and that the specified position is between the first starting position value and the first ending position value, and returning a first identifier of the first segment.

19. The method of claim 18, further comprising receiving another request to append another event, the request specifying the first identifier and the specified position, in response to the other request, determining whether the specified position is greater than the first ending position value, and, in response to determining that the specified position is not greater than the first ending position value, appending data of the other event to the first segment.

20. The method of claim 17, further comprising determining whether the second ending position value is greater than the third ending position value, in response to determining that the second ending position value is greater than the third ending position value, updating the third ending position value with the second position value, and, in response to determining that the second ending position value is not greater than the third ending position value, updating the second ending position value with the third position value.

\* \* \* \* \*